United States Patent
Nakanishi et al.

(10) Patent No.: US 11,902,369 B2
(45) Date of Patent: Feb. 13, 2024

(54) AUTOENCODER, DATA PROCESSING SYSTEM, DATA PROCESSING METHOD AND NON-TRANSITORY COMPUTER READABLE MEDIUM

(71) Applicant: Preferred Networks, Inc., Tokyo-to (JP)

(72) Inventors: Ken Nakanishi, Tokyo-to (JP); Shinichi Maeda, Tokyo-to (JP)

(73) Assignee: Preferred Networks, Inc., Tokyo-to (JP)

( * ) Notice: Subject to any disclaimer, the term of this patent is extended or adjusted under 35 U.S.C. 154(b) by 1248 days.

(21) Appl. No.: 16/271,671

(22) Filed: Feb. 8, 2019

(65) Prior Publication Data

US 2019/0251418 A1 Aug. 15, 2019

(30) Foreign Application Priority Data

Feb. 9, 2018 (JP) ................. 2018-022349

(51) Int. Cl.
*H04L 67/1097* (2022.01)
*G06T 9/00* (2006.01)

(52) U.S. Cl.
CPC .......... *H04L 67/1097* (2013.01); *G06T 9/002* (2013.01)

(58) Field of Classification Search
CPC ...... G06N 3/0454; G06N 3/084; G06T 9/002; H04L 67/1097; H04L 67/565; H04L 69/04

See application file for complete search history.

(56) References Cited

U.S. PATENT DOCUMENTS

| | | | |
|---|---|---|---|
| 8,261,264 B2 * | 9/2012 | Winter | G06F 9/5077 709/227 |
| 2006/0251330 A1 | 11/2006 | Toth et al. | |
| 2013/0121573 A1 * | 5/2013 | Shen | G06T 9/00 382/233 |
| 2013/0315497 A1 | 11/2013 | Wang et al. | |

(Continued)

FOREIGN PATENT DOCUMENTS

| | | | |
|---|---|---|---|
| JP | 2005-196040 A | 7/2005 | |
| JP | 2007-503784 A | 2/2007 | |

(Continued)

OTHER PUBLICATIONS

Johannes Balle et al., "End-to end Optimized Image Compression", ICLR 2017.

(Continued)

*Primary Examiner* — Ming Wu
(74) *Attorney, Agent, or Firm* — Foley & Lardner LLP

(57) ABSTRACT

An autoencoder includes memory configured to store data including an encode network and a decode network, and processing circuitry coupled to the memory. The processing circuitry is configured to cause the encode network to convert inputted data to a plurality of values and output the plurality of values, batch-normalize values indicated by at least two or more layers of the encode network, out of the output plurality of values, the batch-normalized values having a predetermined average value and a predetermined variance value, quantize each of the batch-normalized values, and cause the decode network to decode each of the quantized values.

27 Claims, 13 Drawing Sheets

(56) References Cited

U.S. PATENT DOCUMENTS

| | | | |
|---|---|---|---|
| 2014/0169662 A1* | 6/2014 | Liu | G06V 30/194 |
| | | | 382/218 |
| 2016/0277239 A1* | 9/2016 | Qu | H04L 41/08 |
| 2017/0230675 A1 | 8/2017 | Weierstra et al. | |
| 2017/0286830 A1* | 10/2017 | El-Yaniv | G06N 3/084 |
| 2018/0060687 A1* | 3/2018 | Wang | G06V 10/454 |
| 2020/0184318 A1 | 6/2020 | Minezawa et al. | |

FOREIGN PATENT DOCUMENTS

| | | |
|---|---|---|
| JP | 4303135 B2 | 7/2009 |
| JP | 2013-247683 A | 12/2013 |
| JP | 2018-061091 A | 4/2018 |
| WO | WO-2012/109407 A1 | 8/2012 |
| WO | WO 2017/136083 A1 | 8/2017 |
| WO | WO-2017/196931 A1 | 11/2017 |
| WO | WO-2010/19008752 A1 | 1/2019 |

OTHER PUBLICATIONS

Oren Rippel et al., "Real-Time Adaptive Image Compression", ICML2017.

George Toderici et al., "Full Resolution Image Compression with Recurrent Neural Networks", CVPR2017.

Olaf Ronneberger et al., "U-Net: Convolutional Networks for Biomedical Image Segmentation", arXiv May 18, 2015.

Fabian Mentzer et al., "Conditional Probability Models for Deep Image Compression", arXiv:1801.04260v1, Jan. 12, 2018 URI: https://arxiv.org/pdf/1801.04260v1.pdf.

George Toderici et al., "Variable Rate Image Compression With Recurrent Neural Networks", ICLR 2016 arXiv:1511.06085v5, Mar. 1, 2016 URI: https://arxiv.org/pdf/1511.06085.pdf.

Ken Nakanishi et al., "Neural Multi-scale Image Compression", arXiv:1805.06386v1, May 16, 2018; URI: https://arxiv.org/pdf/1805.06386.pdf.

Masayuki Imanishi et al., "Proposal of a Lossy Compression Method based on Binarized Autoencoder", IEICE2017 a-2-6, 2017, with English machine translation. URI: https://www.ieice.org/publications/conferences/summary.php?id=CONF0000111747&expandable=0&ConfCd=2017G&session_num=A-2&lecture_number=A-2-6&year=2017&c onf_type=G.

Nick Johnston et al., "Improved Lossy Image Compression with Priming and Spatially Adaptive Bit Rates for Recurrent Networks", arXiv:1703.10114v1, Mar. 29, 2017 URI: https://arxiv.org/pdf/1703.10114.pdf.

Adna Sento, "Image Compression with Auto-encoder Algorithm using Deep Neural Network (DNN)", The 2016 Management and Innovation Technology International Conference (MITiCON-2016), 2016, pp. MIT99-103 (5 pages).

Hiroyuki Koike et al., "Image coding method capable of reversible conversion to JPEG- compliant bitstream", IPSJ SIG Technical Report, vol. 2011-AVM-73, No. 5, Jul. 14, 2011, pp. 1-6 (Same as IEICE Technical Report, vol. 133, No. 111, pp. 25-30, Jul. 7, 2011), with English machine translation (12 pages).

Jun Ishii et al., "A study of DNN with variable data bit width and its accelerator architecture", IPSJ SIG Technical Report, vol. 2017-ARC-227, No. 25, Jul. 27, 2017, pp. 1-8 (Same as IEICE Technical Report, vol. 117, No. 154, pp. 83-89, Jul. 19, 2017), with English machine translation (16 pages).

Kanatsu Umemoto et al., "Breast cancer diagnosis from histopathological images using deep learning", IEICE Technical Report, May 18, 2017, vol. 117, No. 50, pp. 1-6, with English machine translation (12 pages).

Lucas Theis et al., "Lossy Image Compression With Compressive Autoencoders", ICLR 2017, Mar. 1, 2017, pp. 1-19, arXiv:1703.00395v1 (19 pages).

Satoru Jimbo et al., "Characteristics of Deep Learning-based Coding Parameter Adaptive Noise Reduction for H.265/HEVC Compressed Image", IMPS2017, Nov. 20, 2017, pp. 34-35, with English machine translation (5 pages).

* cited by examiner

AUTOENCODER, DATA PROCESSING SYSTEM, DATA PROCESSING METHOD AND NON-TRANSITORY COMPUTER READABLE MEDIUM

CROSS REFERENCE TO RELATED APPLICATIONS

This application claims the benefit of and priority to Japanese Patent Application No. 2018-022349, filed on Feb. 9, 2018, the entire contents of which are incorporated herein by reference.

FIELD

Embodiments described herein relate to an autoencoder, a data processing system, a data processing method, and a non-transitory computer readable medium.

BACKGROUND

The method of transferring data over a network such as the Internet is developed day by day, and the data transfer speed is also increased through effective use of network bandwidth. On the other hand, the performance of a camera capable of acquiring moving images with 4K resolution and a voice recorder capable of acquiring voice data with high bit rate are also developed. Therefore, even if the bandwidth for data transfer is effectively used, the bandwidth may be insufficient for transfer of the high-definition moving image, voice and so on in some cases. Further, compression of data is a useful technique not only for data transfer but also for data storage because its size can be reduced.

In consideration of the increase in data amount of various kinds of data, the data compression technique is of high importance even in these days. In particular, it is desired to decrease the distortion in a lossy compression technique with high compressibility or increase the compression ratio even with the distortion equivalent to that in the prior art. The data compression using the neural network is now studied but has difficulty in achieving the above object.

DETAILED DESCRIPTION

According to some embodiments, an autoencoder apparatus may perform learning to optimize a predetermined objective function, and the autoencoder apparatus may include a memory configured to store data and processing circuitry coupled to the memory. The processing circuitry may be configured to batch-normalize each of values indicated by at least two or more layers including a deepest layer of an encode network. The encode network and a decode network may be stored in the memory. The processing circuitry may be configured to cause the encode network to convert inputted data to a plurality of values and output the plurality of values, batch-normalize values indicated by at least two or more layers of the encode network, out of the output plurality of values, so that the batch-normalized values have a predetermined average value and a predetermined variance value. The processing circuitry may be further configured to quantize each of the batch-normalized values, and cause the decode network to decode each of the quantized values.

In some embodiments, two neural networks may be used. A first neural network may convert given data to a feature amount, and discretize the feature amount. In the discretization, a feature amount having a plurality of resolutions may be discretized, whereby both a feature amount holding global information and a feature amount holding local information may be quantized. The quantized feature amounts may be subjected to lossless compression by a second neural network. The second neural network may estimate occurrence probabilities of the feature amounts. Encoding may be performed with arithmetic codes based on the estimated probabilities. The second neural network may be characterized by assuming conditional independence about the occurrence probabilities of the feature amounts and estimating their conditional probabilities, and may use the conditional independence to shorten the calculation time taken for encoding and decoding.

In some embodiments, it is also possible to handle the first neural network and the second neural network as independent neural networks, and it is also possible to perform data compression using only the first neural network and data compression using only the second neural network.

Figure 1:
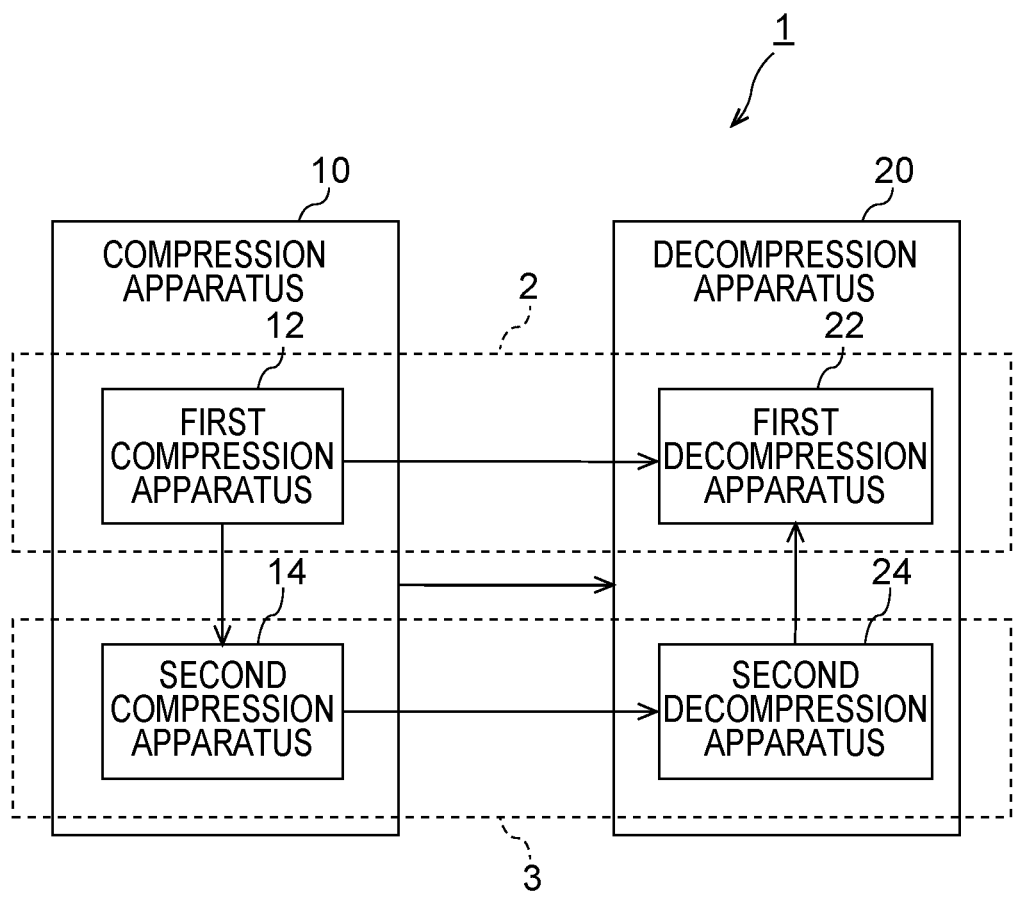
FIG. 1 illustrates a data processing system according to some embodiments.

FIG. 1 is a block diagram schematically illustrating a data processing system including a data compression apparatus according to some embodiments. A data processing system 1 may include a compression apparatus 10 which compresses data, and a decompression apparatus 20 which decompresses the data compressed by the compression apparatus 10. The compression apparatus 10 and the decompression apparatus 20 may be included in the same apparatus or may be included in different apparatuses connected with each other over a network or the like.

The compression apparatus 10 may include a first compression apparatus 12 and a second compression apparatus 14. The first compression apparatus 12 may be an apparatus which performs lossy compression on data using a neural network. The second compression apparatus 14 may be an apparatus which similarly performs compression on data using a neural network, but performs lossless compression unlike the first compression apparatus 12.

The decompression apparatus 20 may include a first decompression apparatus 22 and a second decompression apparatus 24. The first decompression apparatus 22 may be an apparatus which decompresses the compressed data compressed by the first compression apparatus 12. The second decompression apparatus 24 may be an apparatus which decompresses the compressed data compressed by the second compression apparatus 14.

The compression apparatus 10 may compress data by performing lossless compression using the second compression apparatus 14 on the data subjected to lossy compression by the first compression apparatus 12. The decompression apparatus 20 may decompress data by decompressing the data through the two stages of compression process to the lossy-compressed data using the second decompression apparatus 24 and subsequently decompressing the lossy-compressed data using the first decompression apparatus 22.

The data processing system 1 may have, but not limited to, a configuration including the compression apparatus 10 and the decompression apparatus 20. The compression apparatus 10 may include the first compression apparatus 12 and the second compression apparatus 14. The decompression apparatus 20 may include the first decompression apparatus 22 and the second decompression apparatus 24.

For example, as indicated with broken lines, a first data processing system 2, which includes the first compression apparatus 12 and the first decompression apparatus 22 and performs lossy compression and decompression, or a second data processing system 3, which includes the second compression apparatus 14 and the second decompression apparatus 24 and performs lossless compression and decompression, may independently constitute a data processing system. The data processing system according to some embodiments can function also as a system which performs only lossy compression or a system which performs only lossless compression as described above.

Assuming that a signal to be compressed is x and a signal after reconstruction of the compressed code is $\hat{x}$, $\hat{x}$ may be a discrete value, whereas x may be a continuous value or a discrete value. Reconstruction with distortion (i.e., lossy compression) may be performed for the purpose of decreasing the expectation of a loss $L(x, \hat{x})$ which is distortion between the signal after compression $\hat{x}$ and the signal before compression x, while minimizing a code length $l(\hat{x})$ of $\hat{x}$. In some embodiments, for the loss L, for example, MSSSIM (Multi-Scale Structural Similarity for Image Quality Assessment) may be used. Not limited to this, in some embodiments, an evaluation function which decreases the difference between the human subjectivity and an error can be used as the loss L.

Here, it is assumed that an encoder (F) encoding a signal is used to express $z=F(x)$, a multivalued quantization function QA is used to express $\hat{z}=QA(z)$, and a decoder (G) decoding a signal after quantization is used to express $\hat{x}=G(QA(F(x)))$. The multivalued quantization function may be used to perform quantization independently for each dimension when z is a multidimensional variable. The quantization refers to an operation of rounding a continuous variable taking a continuous value to any of a predetermined number of discrete values determined in advance such as four values or seven values. In the above expression, the above-described purpose, e.g., decreasing the expected loss $L(x, \hat{x})$ while minimizing the code length $l(\hat{x})$ of $\hat{x}$, can come down to two problems such as $\min_{F,G,QA} E[L(x, \hat{x})]$ and $\min_{F,QA} l(\hat{x})$ where $E[\cdot]$ represents the expected value of the occurrence probability of data x.

The two problems can be formulated as a constrained optimization problem of suppressing both $\min_{F,G,QA} E[L(x, \hat{x})]$ and $\min_{F,QA} l(\hat{x})$ to a certain value or less. Alternatively, the two problems can be formulated as a minimization problem of decreasing a rate distortion function being a sum of the distortion and the code length (or entropy as a lower limit) multiplied by constants. The case of changing the tradeoff between the distortion and the code length can be basically handled by increasing the number of variables to be quantized and can be realized also by simultaneously performing change of the quantization number of the quantization function and encoding with distortion of allowing different codes in the encoding of $\hat{x}$ to be unified into the same code.

To solve the above-noted problems, the present disclosure describes the following two solutions.
(1) Compression by an autoencoder optimized for the multivalued quantization function (lossy).
(2) Arithmetic coding of a multivalued quantization tensor based on the predicted value by the neural network (lossless).

Hereinafter, each of the lossy compression of (1) and the lossless compression of (2) will be described in detail.

(First Compression Apparatus, First Decompression Apparatus)

Figure 2:
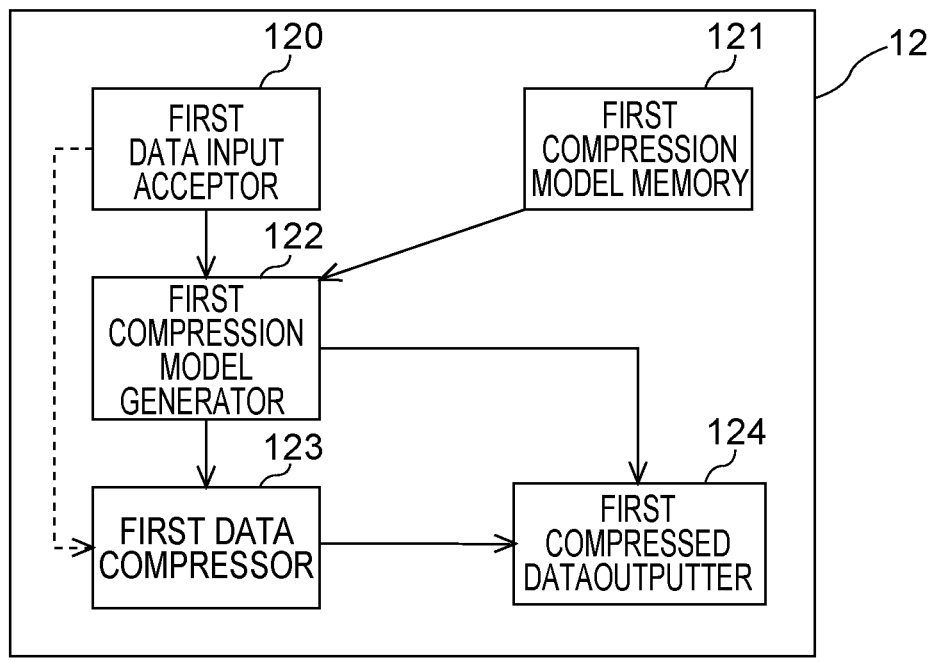
FIG. 2 illustrates the function of a first compression apparatus according to some embodiments.

FIG. 2 is a block diagram illustrating the function of the first compression apparatus 12. The first compression apparatus 12 may include a first data input acceptor 120, a first compression model memory 121, a first compression model generator 122, a first data compressor 123, and a first compressed data outputter 124.

The first data input acceptor 120 may be an interface which accepts input of data being an object to be compressed. Through the first data input acceptor 120, information for model generation or model selection, such as a hyperparameter for performing compression while putting how much weight on which of the distortion loss when decoding and the code length when compressing, may be inputted.

The first compression model memory 121 may store a form of a model for performing compression, and may additionally store programs and data for the processing. In some embodiments, the first compression model memory 121 may be implemented with EPROM, EEPROM, SDRAM, and flash memory devices, CD ROM, DVD-ROM, or Blu-Ray® discs and the like.

The first compression model generator 122 may be a module which performs lossy compression, and may select or generate the model for compression using a neural network model of the form stored in the first compression model memory 121. The neural network model of the form may be a model formed as an autoencoder based on, for example, a CNN (Convolution Neural Network). The compression of data may be executed using an encoder portion (or encode network part) of the generated autoencoder.

The first compression model generator 122 may generate, by learning, a first compression model for compressing the data inputted from the first data input acceptor 120. After completion of the learning, a parameter to form the model used for the learning, in particular, a parameter to generate a decoder layer (or decode network part) of the autoencoder may be sent as a first parameter to the first compressed data outputter 124.

The first data compressor 123 may compress the data inputted from the first data input acceptor 120 using the first compression model generated by the first compression model generator 122. The compressed data may be sent to the first compressed data outputter 124.

For example, as described above, the input data may be inputted to a layer including the encoder of the autoencoder, and a quantized output of the encoder may be regarded as the compressed data. As another example, a feature amount different in resolution for each layer may be extracted in the process of encoding by the encoder portion, but data may be appropriately extracted from the output data in each layer and quantized to form compressed data. Note that though quantization may be used in the case of performing second compression subsequent to the first compression, the quantization is not an essential configuration in the case of performing data compression using only the first compression apparatus 12 and the first decompression apparatus 22.

The first compressed data outputter 124 may output the data subjected to lossy compression. Not only the data compressed by the first data compressor 123 but also parameters of layers to reproduce the first compression model for decoding may be outputted.

In some embodiments, at least one or more of the first data input acceptor 120, the first compression model generator 122, the first data compressor 123, and the first compressed data outputter 124 may be implemented with a special circuit (e.g., circuitry of a FPGA, CPU, GPU or other processing circuits implemented using electronic circuits), a subroutine in a program stored in memory (e.g., EPROM, EEPROM, SDRAM, and flash memory devices, CD ROM, DVD-ROM, or Blu-Ray® discs and the like) and executable by a processor (e.g., CPU, GPU and the like), or the like.

Figure 3:
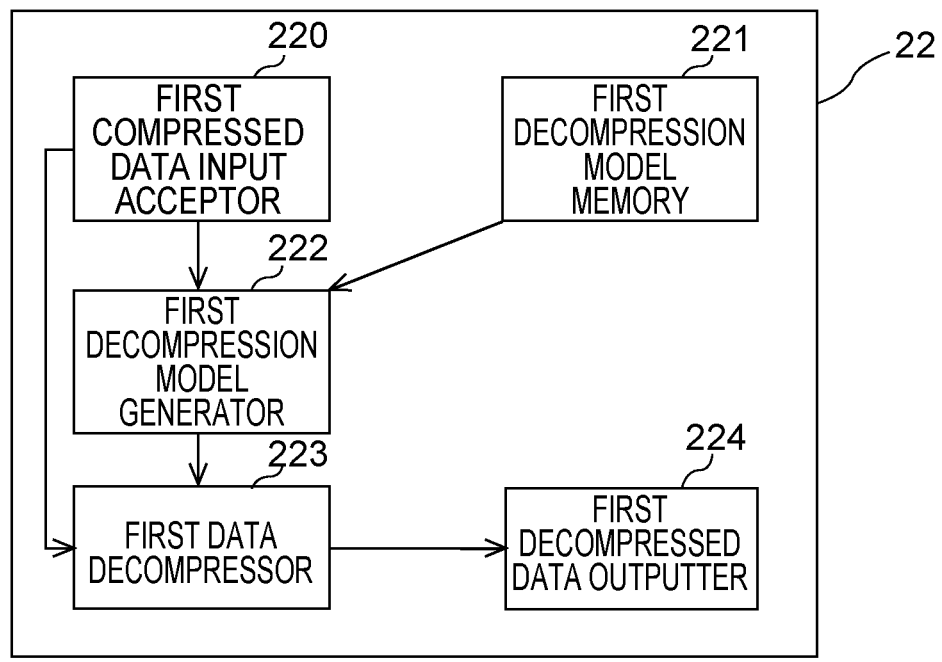
FIG. 3 illustrates the function of a first decompression apparatus according to some embodiments.

FIG. 3 is a block diagram illustrating the function of the first decompression apparatus 22. The first decompression apparatus 22 may include a first compressed data input acceptor 220, a first decompression model memory 221, a first decompression model generator 222, a first data decompressor 223, and a first decompressed data outputter 224.

The first compressed data input acceptor 220 may accept input of the lossy-compressed data outputted from the first compression apparatus 12. In the case of performing the second compression subsequent to the first compression, the first compressed data decompressed and outputted from the second decompression apparatus 24 may be inputted into the first compressed data input acceptor 220.

The first decompression model memory 221 may store data being the form of a first decompression model for decompressing the lossy-compressed data outputted from the first compression apparatus 12. This form may be a model being the first decompression model by setting parameters, and may correspond, for example, to a decoder portion of the autoencoder when the first compression model is the encoder portion of the autoencoder. In some embodiments, the first decompression model memory 221 may be implemented with EPROM, EEPROM, SDRAM, and flash memory devices, CD ROM, DVD-ROM, or Blu-Ray® discs and the like.

The first decompression model generator 222 may extract a first parameter to generate the first decompression model, of the lossy-compressed data inputted into the first compressed data input acceptor, and generate the first decompression model based on the data and on the model stored in the first decompression model memory 221.

The first data decompressor 223 may input the lossy-compressed data, other than the first parameter, of the compressed data inputted from the first compressed data input acceptor 220, into the first decompression model generated by the first decompression model generator 222 to decompress the lossy-compressed data.

The first decompressed data outputter 224 may output the data decompressed by the first data decompressor 223.

In some embodiments, at least one or more of the first compressed data input acceptor 220, the first decompression model generator 222, the first data decompressor 223, and the first decompressed data outputter 224 may be implemented with a special circuit (e.g., circuitry of a FPGA, CPU, GPU or other processing circuits implemented using electronic circuits), a subroutine in a program stored in memory (e.g., EPROM, EEPROM, SDRAM, and flash memory devices, CD ROM, DVD-ROM, or Blu-Ray® discs and the like) and executable by a processor (e.g., CPU, GPU and the like), or the like.

Figure 4:
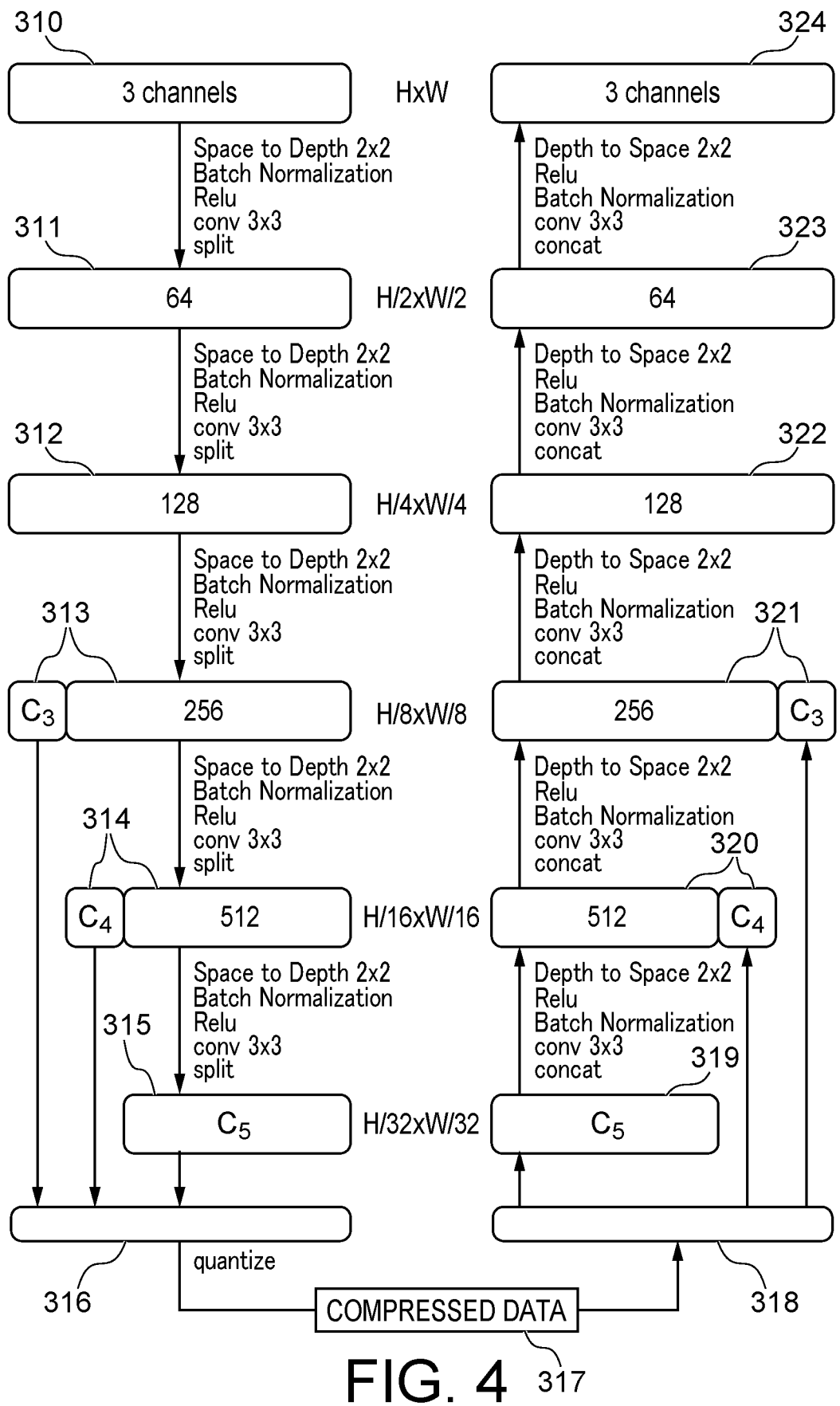
FIG. 4 illustrates an example of a lossy compression network according to some embodiments.

FIG. 4 is a chart illustrating the outline of a neural network configuration for lossy compression and decompression according to some embodiments. Hereinafter, the compression apparatus will be described as the autoencoder using the CNN, but similar processing may be performed using another neural network model other than the CNN or another function having an adjustable parameter. An input image is, for example, an image of three channels such as RGB but, not limited to this, may be another image such as an image of four channels including depth information or an image of four channels obtained by adding an alpha channel, or may be an image of one channel such as a gray scale image. A one-dimensional time sequence audio signal may be used. Hereinafter, description will be provided using an example of a neural network in the case of compressing an image.

The first compression apparatus 12 may learn to optimize an objective function to generate an autoencoder including an encode network part illustrated at a left half and a decode network part illustrated at a right half in FIG. 4. The encode network part may convert data to a plurality of values. The converted values may be subjected to batch normalization and further to quantization. The decode network part may decode the quantized values. The objective function may be, for example, an error between the inputted data and the data outputted from the autoencoder, or may be a loss function for performing backpropagation obtained in optimization.

The network illustrated in FIG. 4 is described as an autoencoder having a structure of five layers as an example, but the number of layers is not limited to five. Besides, data 316 collected from data 313, 314 and 315 is used as the data to be used as compressed data, but not limited to this. The data may be, for example, the one that the user can dynamically change in data compression based on the processing speed, the tolerance for distortion, or the data size after compression. In this case, those parameters may be used as hyperparameters in selecting a network.

More specifically, when using predetermined numbers n, m, the network as an autoencoder may perform the processing on n layers by encode and decode, and perform compression while acquiring an m predetermined number, an m+1 predetermined number, . . . , and an n predetermined number of pieces of data from an m-th layer to an n-th layer. Further data compression may be performed by quantizing the pieces of data. Furthermore, data compression may be performed by performing lossless compression on the acquired quantized data.

In FIG. 4, the connection between the layers may be subjected to operation for each 2×2 pixels by a convolution kernel (or filter) of 3×3 pixels. In optimization (or learning) of the network, batch normalization to force the statistics such as an average and a variance of the output value after convolution to take specific values may be performed, and activation may be performed using a ReLU (Rectified Linear Unit).

Performing the batch normalization may enable increase in efficiency of the second compression in the case of performing the second compression (i.e., lossless compression) subsequent to the first compression (i.e., lossy compression). This is because, in the case where the statistics of the output are completed, the need to estimate the function independently for each output is eliminated to enable increase in the compression efficiency when performing lossless compression using the function having a common part between the outputs, and because the entropy of the output is decreased to enable decrease in the average code length when performing lossless compression.

H and W in the drawing represent the height of the image and the width of the image when the inputted data is an image, respectively. In each processing of one layer, the height H and the width W each may become ½ times in encode and become 2 times in decode.

For encode, the data is processed in each layer as described below. For example, in the case where the data 310 of three channels is inputted into an input layer, after the above convolution, the data may be converted to data 311 of 64 channels in a first layer. Thereafter, similarly, the data 311 may be converted to data 312 of 128 channels by the processing in a second layer.

Similarly, the data 312 may be converted to data 313 of $256+C_3$ channels by the processing in the third layer. By the processing in the fourth layer, data corresponding to 256 channels of the data 313 generated in the third layer may be converted to data 314 of $512+C_4$ channels. Then, by the processing in the fifth layer, data corresponding to 512 channels of the data 314 generated in the fourth layer may be converted to data 315 of $C_5$ channels.

Filters which generate the data corresponding to $C_3$, $C_4$, and $C_5$ channels may be installed in advance or may be obtained in the learning process of the autoencoder. When using the CNN, a local feature amount high in resolution may be outputted in a shallow layer such as the third layer 313 which acquires the data corresponding to the $C_3$ channels, and a global feature amount low in resolution may be outputted in a deep layer 315 such as the fifth layer which acquires the data corresponding to the $C_5$ channels. Therefore, in the case of desiring to hold local and precise information as much as possible, it is desirable to use the network with $C_3$ increased in number. Conversely, in the case of desiring to give priority to the compression efficiency, it is desirable to use a network with $C_3$ relatively decreased and $C_5$ relatively increased.

Decreasing the distortion in decoding can be realized also by finely taking the quantization numbers of the data of $C_3$, $C_4$, and $C_5$. As an example, the autoencoder may be generated with $C_3=24$, $C_4=24$, and $C_5=32$. Some models with the values of $C_3$ to $C_5$ changed may be generated beforehand in consideration of the distortion, compression ratio or the like, and a model to be used for compression may be selected based on the parameter such as the compression ratio designated by the user in the data compression. In such a case, information on which model has been used may be stored in the compressed data 317, for example, a header part of the compressed data.

The filters which generate the data corresponding to the $C_3$, $C_4$, and $C_5$ channels may be the ones optimized during learning by the autoencoder. In other words, it may be optimized by learning what kind of filter used as the filter for generating the compressed data exhibits excellent decompressibility.

The data corresponding to the $C_3$, $C_4$, and $C_5$ channels may be converted so as to have a predetermined average value and a predetermined variance value by the batch normalization. The predetermined average value may be, for example, 0, and the predetermined variance value may be, for example, 1. For performing the batch normalization, a batch normalizer (not illustrated) may be further provided in the first compression apparatus 12.

The batch normalized data corresponding to the $C_3$, $C_4$, and $C_5$ channels may be quantized and transferred, held and so on as the compressed data 317. For performing the quantization, a quantizer (not illustrated) may be further provided in the first compression apparatus 12 (see FIG. 2). The batch normalizer and the quantizer may be independently provided in the first compression apparatus 12, or may be provided in the first data compressor 123.

For decode, the reconstruction data may be reconstructed by performing an operation reverse to that of the encode. First, the quantized data 319 corresponding to the $C_5$ channels may be subjected to convolution, coupling, batch normalization, and activation by a 3×3 convolution kernel in the fifth layer and thereby converted to the data of the 512 channels.

The quantized data corresponding to the $C_4$ channels is coupled to the data of the 512 channels, and processing in the fourth layer may be performed. By the processing in the fourth layer the number of channels may become 256. Subsequently, similarly the quantized data corresponding to the $C_3$ channels may be coupled to the data of the 256 channels, and processing in the third layer may be performed. The data may be decompressed to data 322 of 128 channels by the processing in the third layer to data 323 of 64 channels by the processing in the second layer, and to data 324 of 3 channels by the processing in the first layer.

The quantized data corresponding to the $C_3$, $C_4$, and $C_5$ channels and the filters, parameters and so on used in each layer may be provided in the compressed data in encode to enable the decoder to generate the model of the decoder having a structure symmetrical to the model of the encoder.

The parameters and so on are, for example, parameters such as the number of layers of the CNN, the hyperparameters and the parameter of a weight applied on the output from each layer such as a filter to form the layer obtained by learning in each layer, and so on. The filter itself may be provided in the compressed data, but the filter may be configured to generate a model having a learned filter so as to use a predetermined one optimized for learning in advance.

Models having different structures may be learned beforehand, and a model suitable for desired compression conditions may be selected from among them and generated. As an example of learning of the model, a predetermined number of filters may be prepared, a model may be generated with initial values of the filters being determined, and provided in the first compression model memory 121 (see FIG. 2) and the first decompression model memory 221 (see FIG. 3) with the coupling coefficient of the filter being optimized so that the output of the model minimizes the distortion loss.

The optimization of the encoder and the decoder may be performed so that the distortion loss expected value E[L(x, x^)] becomes small as described above. The optimization of an encoder F (e.g., the portion illustrated at the left half of FIG. 4) and a decoder G (e.g., the portion illustrated at the right half of FIG. 4) may be performed using a parametric function. For example, in the case where the encoder F and the decoder G are characterized by parameters θ, φ, optimization of $\min_{\theta, \varphi} E[L(x, \hat{x})]$ may be performed.

The expected value E[·] may be approximated by a sample average of a signal randomly obtained from a signal source desired to be compressed and encoded. Besides, regarding the optimization of the encoder F, the above-described rate distortion loss function (e.g., a sum of the distortion and the code length (or entropy as a lower limit) multiplied by constants) may be minimized. Such optimization may be executed by the same technique as that of the optimization of a general neural network. In the above-described example, the optimization may be performed similarly to the optimization of the autoencoder using a general CNN.

Next, the quantization of the data acquired by the encoder will be described. The quantization in some embodiments may be executed by performing batch normalization, clipping, scale conversion, and operation by a quantization function on the data being an object of quantization.

(Batch Normalization)

Generally, the batch normalization applies linear transformation to the parameter to thereby perform normalization so that the statistics such as its average and standard deviation have specific values. For example, the batch normalization to an output O can be expressed by a product of a sum of the output and a constant β, and, a constant γ, such as γ(O+β). The constants β and γ can be adjusted during the learning, for example, so that the average of γ(O+β) becomes 0 and the standard deviation thereof becomes 1, and the normalization can be performed through use of the values.

Leading the average and the standard deviation to have specific values in advance as described above can make it possible to bias the distribution of data (e.g., data outputted from each layer) before quantization, namely, to make the entropy small as compared with that in the case of random distribution. Accordingly, this processing can shorten the average code length when performing the second compression in the case of performing the second compression after the first compression. The batch normalization may be executed by the batch normalizer (not illustrated) in the first compression apparatus 12 as described above.

(Clipping)

Subsequently, the data subjected to batch normalization may be subjected to clipping. The clipping refers to shaping the data into a fixed range such as [t, u] (where t<u).

Figure 5:
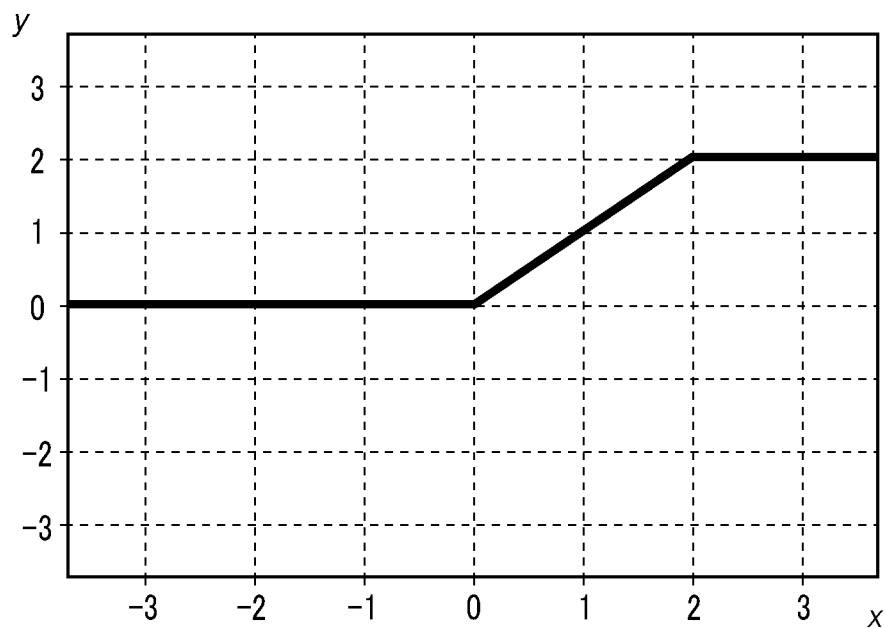
FIG. 5 illustrates an example of clipping according to some embodiments.

FIG. 5 is a graph illustrating an example of the clipping according to some embodiments. In FIG. 5, the x-axis represents data before quantization, and the y-axis represents data after quantization. FIG. 5 illustrates the clipping applied to the data with t=0, u=2. As illustrated in this graph, the clipping may be performed so that the data of t or less becomes t and the data of u or more becomes u. The data of [t, u] is not subjected to conversion. In other words, the clipping on [t, u] of an output x can be described as max (min (x, u), t).

(Scale Conversion)

When the data after quantization is 0, 1, . . . , N−1, the data converted by the graph may be multiplied by (N−1)/u. The clipping and multiplying by a magnification can make it possible to limit the data after quantization to N values such as 0, 1, . . . , N−1.

(Quantization Function)

Quantizing the data after scale conversion can discretize the data. The quantization mentioned here means the processing of rounding the value after the decimal point of the data by some kind of method into an integer. For example, QA is regarded as a function of converting a fractional value into an integer value by rounding off, namely, QA(z)=round (z). The round(z) may be a function differing depending on a system to be handled and may be, for example, a function such as QA(a)=i with respect to a scalar value a, if a∈[i−0.5, i+0.5). By using the function quantized to multiple values as the quantization function in the output layer of the encoder, the output of the encoder can be quantized.

The multivalued quantization is not limited to rounding off the value after the decimal point as described above, but may be other rounding methods such as rounding down, rounding up, rounding to 0, rounding to positive or negative infinite, rounding to even, and rounding to odd for the value after the decimal point.

Explicitly expressing the parameters characterizing the encoder F and the decoder G as θ, φ, z=F(x, θ), ẑ=QA(z), x̂=G(ẑ, φ), l=L(x, x̂) can be described as described above. When differentiating by θ, φ, l is expressed as follows.

$$\frac{\partial l}{\partial \theta} = \frac{\partial l}{\partial \hat{x}} \frac{\partial \hat{x}}{\partial \hat{z}} \frac{\partial \hat{z}}{\partial z} \frac{\partial z}{\partial \theta} \qquad (1)$$

$$= \frac{\partial L(x, \hat{x})}{\partial \hat{x}} \frac{\partial G(\hat{z}, \phi)}{\partial \hat{z}} \frac{\partial QA(z)}{\partial z} \frac{\partial F(x, \theta)}{\partial \theta}$$

$$\frac{\partial l}{\partial \phi} = \frac{\partial l}{\partial \hat{x}} \frac{\partial \hat{x}}{\partial \phi} \qquad (2)$$

$$= \frac{\partial L(x, \hat{x})}{\partial \hat{x}} \frac{\partial G(\hat{h}, \phi)}{\partial \phi}$$

Here, when QA is quantization by a normal step function, for example, the quantization of QA(a)=i in the case where the variable a satisfies a∈[i−0.5, i+0.5) with respect to an integer i, differentiation is not defined by ∂QA/∂z=0, a=i−0.5 in a∈[i−0.5, i+0.5). Therefore, the learning by backpropagation cannot be performed any longer. In some embodiments using the backpropagation, the gradient may be calculated with replacement such as ∂QA/∂z=1 as an example, to update the network. With such a replacement, the gradient is expressed as follows.

$$\frac{\partial l}{\partial \theta} = \frac{\partial l}{\partial \hat{x}} \frac{\partial \hat{x}}{\partial \hat{z}} \cdot 1 \cdot \frac{\partial z}{\partial \theta} \qquad (3)$$

$$= \frac{\partial L(x, \hat{x})}{\partial \hat{x}} \frac{\partial G(\hat{z}, \phi)}{\partial \hat{z}} \cdot 1 \cdot \frac{\partial F(x, \theta)}{\partial \theta}$$

First Modified Example of Quantization

In addition to setting the differentiation by z of the quantization function QA to 1, activation may be performed after conversion of z using the following conversion function before being input into QA, and backpropagation may be performed.

$$snake_\alpha(x) = x - \alpha \frac{\sin(2\pi x)}{2\pi} \quad (4)$$

Figure 6:
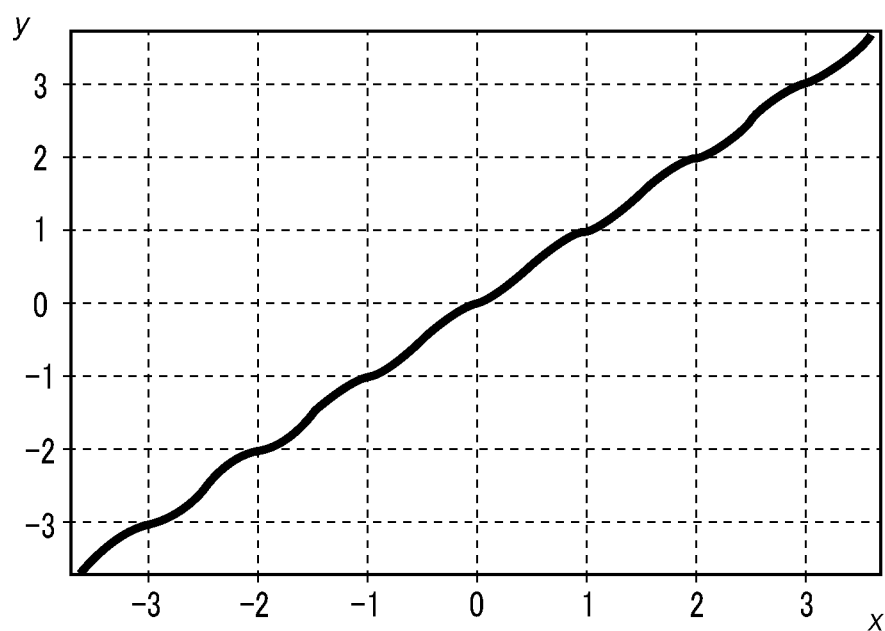
FIG. 6 illustrates an example of a data conversion function according to some embodiments.

Here, the conversion function is a predetermined value satisfying $a \in [0, 1]$. FIG. 6 is a graph illustrating an example with a=0.5 in the conversion function expressed by eq. 4. As illustrated in the graph, the conversion function is a differentiable continuous function which takes a shape close to that of the step function by the differential coefficient approaching 0 when the input is around an integer value, and is more gradually connected to integer values before and after it as it becomes more distant from an integer value.

Applying the function before multiplying QA by the function can make z approach an integer value, and enables the quantization function to decrease in approximation error when performing the backpropagation approximate to an identity mapping.

Second Modified Example of Quantization

In the above-described optimization of the encoder and the decoder, the optimization using a gradient method is enabled by approximating the nondifferentiable operation such as quantization. In this modified example, a method of performing the optimization by stochastically performing operation of the quantization and differentiating the probability to obtain the gradient without bias will be described.

A scalar quantizer is expressed as $QA(y)=\hat{y_i}$ (if $y \in S_i$). Here, it is assumed that $\hat{y_i} < \hat{y_{i+1}}$, $S_i \cap S_{i+1} = \varphi$ ($\varphi$): assumed to be an empty set). The stochastic quantization is executed by stochastically determining the value $\hat{y}$ after quantization for $y \in \{S_i \cup S_{i+1}\}$.

The parameter characterizing the probability is regarded as $\theta$, and $p_\theta(\hat{y}=\hat{y_i})$ is determined for $y \in \{S_i \cup S_{i+1}\}$. It is assumed that the magnitude of stochastic fluctuation can be adjusted by the parameter $\theta$. For example, $p_\theta$ is a function which smoothly connects 0 and 1 like the sigmoid function. With a probability $p_\theta(\hat{y}=\hat{y_{i+1}})=1-p_\theta(\hat{y}=\hat{y_i})$, $\hat{y} < \hat{y_{i+1}}$. An expected value of a distortion L (y, $\hat{y}$) is expressed as $E_\theta[L(y, \hat{y})]=\int p_\theta(\hat{y}|x)p(x)L(y, \hat{y})dyd\hat{y}$. What is obtained by differentiating the expected value by $\theta$ can be expressed as a form of the expected value, and use of a sample average makes it possible to obtain an estimated value of differentiation without bias.

More specifically, the optimization of the network by the backpropagation method is enabled based on the differentiation thus obtained. On the other hand, in the case of the stochastic quantization, the magnitude of the stochastic fluctuation can be adjusted and weakened to achieve approach to deterministic quantization. After the learning, the deterministic quantization will be performed, so that gradually weakening the magnitude of the stochastic fluctuation during the learning can achieve approach to the optimization of the network under the objective function originally desired to be optimized.

Third Modified Example of Quantization

For the above-described encoder and decoder, an example of generating the encoder suitable for quantized output and the decoder suitable for quantized input by executing complete quantization from the time during learning has been described. In this modified example, a method capable of generating an encoder suitable for quantized output and a decoder suitable for quantized input without executing complete quantization during learning will be described.

To discriminate from the multivalued quantization function QA in image compression in the generated model, quantization executed in an intermediate layer (e.g., deepest layer of the autoencoder) during learning is expressed as a pseudo quantization function QA', and pseudo quantization may be performed using the QA' to perform learning.

Figure 7:
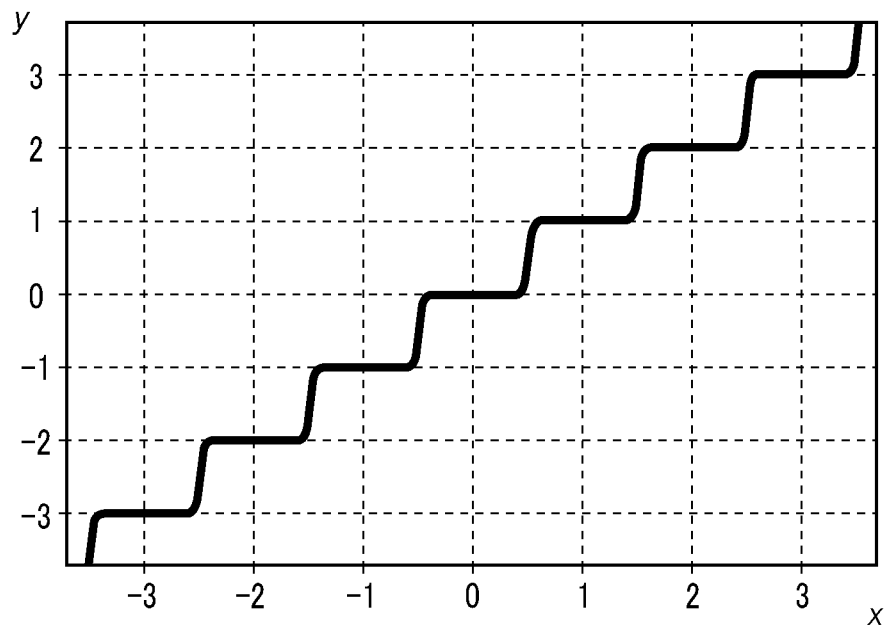
FIG. 7 illustrates an example of a pseudo quantization function according to some embodiments.

It is assumed that a pseudo quantization function QA'(y) is a continuous function close to the step function. An example of the pseudo quantization function which is continuous and differentiable is a function made by synthesizing the snake function expressed in eq. 4. FIG. 7 is a graph illustrating an example of the pseudo quantization function QA'. FIG. 7 is a function obtained by synthesizing the snake function four times as the pseudo quantization function as illustrated below.

$$QA'(x)=snake_{0.9} \circ snake_{0.9} \circ snake_{0.9} \circ snake_{0.9}(x) \quad (5)$$

QA' expressed as above is a function which is continuous and differentiable. Further, as illustrated in FIG. 5, it is found that QA' expressed by eq. 5 takes values close to integer values. As a result of this, in the case of using the pseudo quantization function QA', the value of the loss L decreases from that of the data quantized by the complete step function (QA) without using QA' in optimization as compared with the case of not using the pseudo quantization function.

Figure 8:
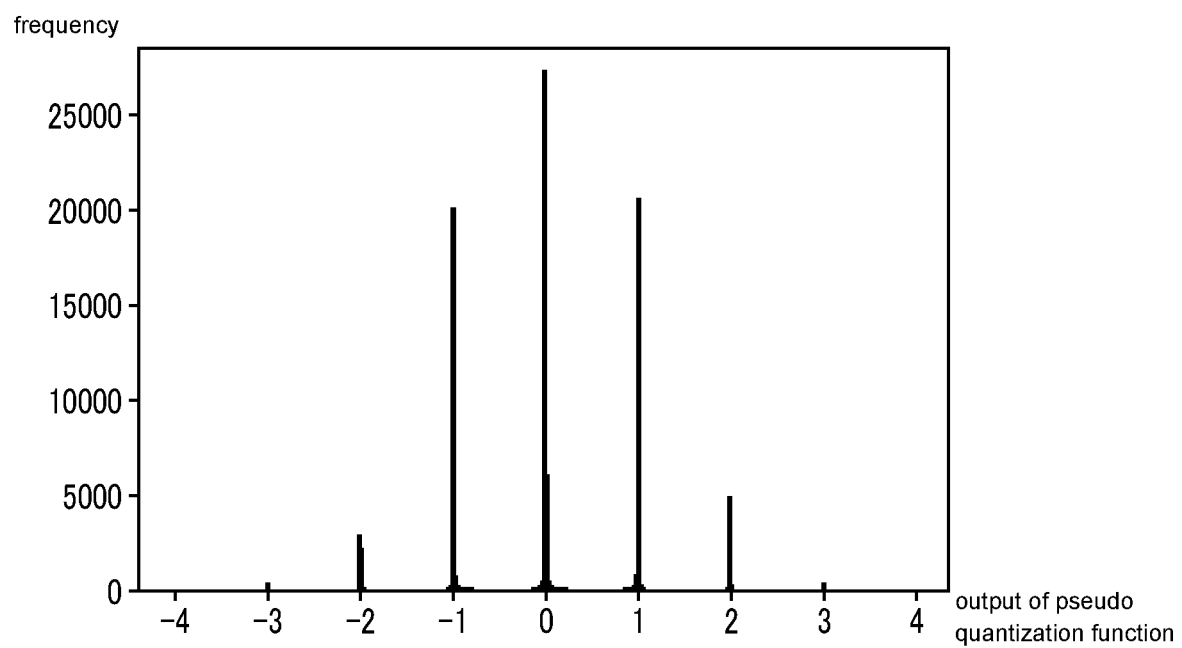
FIG. 8 illustrates an example of output of the pseudo quantization function according to some embodiments.

FIG. 8 is a graph illustrating the distribution of the output in the case of inputting 100000 random numbers according to the normal distribution into the pseudo quantization function QA' expressed in eq. 5. As illustrated in FIG. 8, the inputted values are converted to vicinities of integer values.

By making the values close to integer values rather than the inputted values as described above, a difference between the value of the quantized data in the case of actually performing quantization and the value of the pseudo quantized data in the case of performing pseudo quantization can be made smaller than a difference between the input value and the value of the quantized data. As a result of this, it becomes possible to perform optimization enabling backpropagation because the pseudo quantization function is differentiable, while keeping the state where the result of quantization and the result of pseudo quantization are close.

Each of the quantization functions, each of the pseudo quantization functions, and the function for stochastic quantization indicated in the above may be optimized and changed as an object for learning in the learning.

Figure 9:
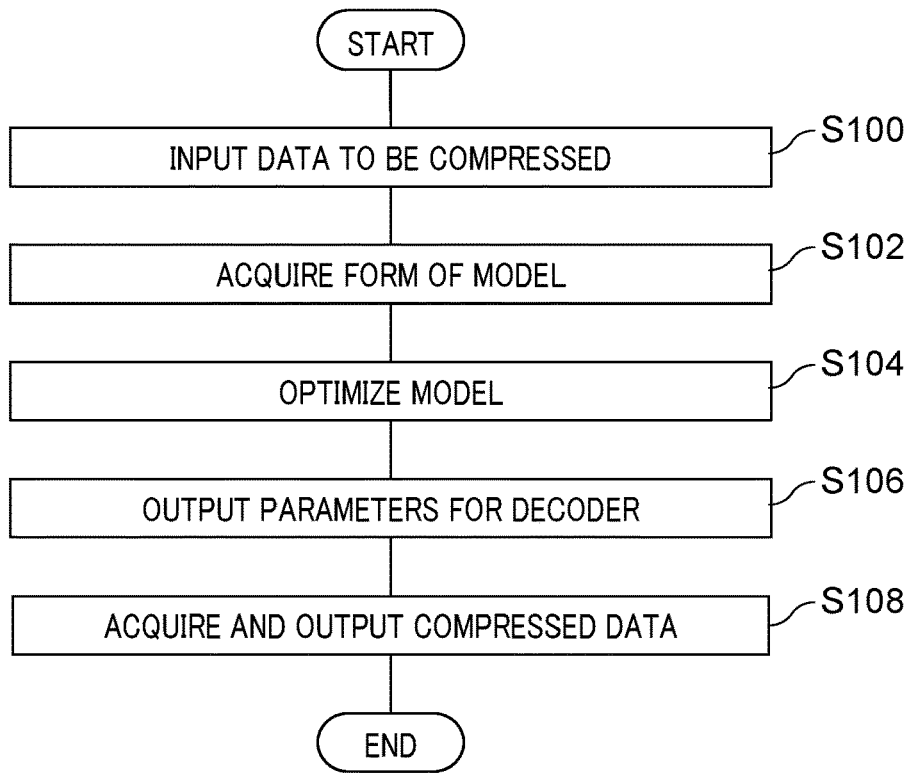
FIG. 9 illustrates lossy compression processing according to some embodiments.

FIG. 9 is a flowchart illustrating generation of the encoder F and the decoder G according to some embodiments by the autoencoder and performing lossy compression processing.

First, the first compression apparatus 12 may accept input of data as a compression source via the first data input acceptor 120 (S100). The data to be inputted is, for example, image data of three channels.

Next, the first compression model generator 122 may acquire the forms of the model to be generated, from the first compression model memory 121, and prepares for model generation (S102). These may be acquired based on the parameters inputted by the user or the like together with the image data, or predetermined forms may be acquired. As another example, pre-processing may be performed on the image data to change the model, for example, based on the resolution, image size or the like.

Next, the first compression model generator 122 may generate a first data processing model as the autoencoder including the encoder F which performs data compression and the decoder G which performs data decompression (S104). The first data processing model is, for example, the autoencoder using the CNN as illustrated in FIG. 4.

The image data inputted via the first data input acceptor 120 may be inputted to the input layer and the output layer of the model. The data inputted to the input layer may be processed by the first layer, . . . , the fifth layer in the layers of the encoder F, and data of $C_3$, $C_4$, and $C_5$ (see FIG. 4) are outputted as described above.

The data processed in each layer outputted from the encoder F may be processed by backpropagation and quantized by the quantization function QA (or the pseudo quantization function QA') for quantization into multiple values as in some examples mentioned in the above.

The quantized data corresponding to the $C_3$, $C_4$, and $C_5$ channels may be inputted from an appropriate layer of the decoder G. After processing in the first layer of the decoder G, the loss between the data processed, namely, decompressed and the input data may be calculated, and an error may be propagated back, thereby optimizing the model.

The optimization of the model may be performed similarly to the general machine learning. The end of the learning may be determined by the fact the value of the loss L becomes smaller than the predetermined value, the fact that the forward propagation and the backpropagation have been performed a predetermined number of times, or the like.

Upon completion of the optimization of the model, the first compression model generator 122 may output parameters to generate the equivalent model in the decoder G (S106). As illustrated in FIG. 2, these parameters may be collectively outputted as one binary file together with the compressed data, or may be outputted as another file.

Subsequently, the first data compressor 123 may perform compression on the input data based on the model generated by the first compression model generator 122 and output the compressed data (S108). The first data compressor 123 may calculate the data corresponding to the $C_3$, $C_4$, and $C_5$ channels (see FIG. 4) using the portion of the encoder F of the model generated by the first compression model generator 122, and may apply the step function (e.g., round function) to the data to thereby multivalue the data, calculate compressed data, and output the compressed data via the first compressed data outputter 124. The multivaluing may be performed using any method as in the above but, in the case of using the multivaluing in learning, it is desirable to use the same multivaluing function as that in the learning.

In some embodiments, the first data compressor 123 is not used. For example, at timing when generating the model, the first compression model generator 122 may generate quantized data when generating the optimal model, and store the data as the compressed data, and in this case, can calculate the compressed data not via the first data compressor 123. Instead, the compressed data calculated as described above may be outputted via the first compressed data outputter 124.

The output destination may be, for example, a memory region in a computer or the like equipped with the first compression apparatus 12, or the compressed data may be outputted and transferred to another apparatus over the network such as the Internet.

Figure 10:
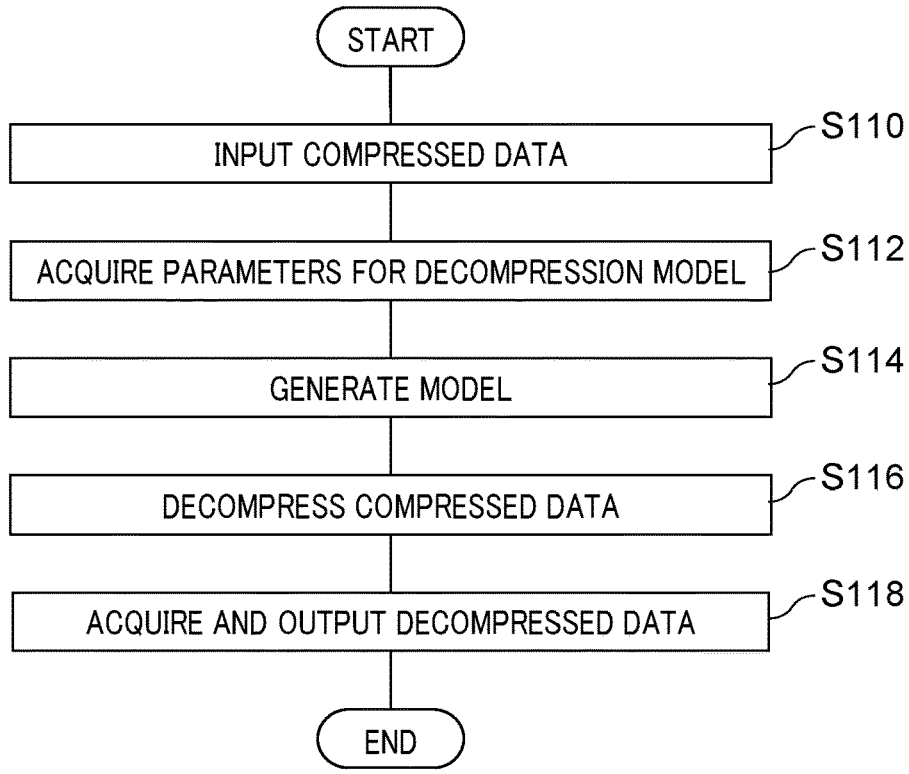
FIG. 10 illustrates decompression processing of lossy-compressed data according to some embodiments.

Next, the decompression processing of the compressed data will be described. FIG. 10 is a flowchart illustrating a flow of processing of decompressing the data subjected to lossy compression.

First, the first decompression apparatus 22 may accept input of the lossy-compressed data compressed by the first compression apparatus 12, via the first compressed data input acceptor 220 (S110). When the data has been subjected to the second compression, the data subjected to the first compression decompressed by the second decompression apparatus 24 may be inputted into the first decompression apparatus 22.

Next, the first decompression model generator 222 may acquire parameters of the inputted data, to generate the first decompression model, namely, the layer of the decoder G of the above-described model (S112).

Subsequently, the first decompression model generator 222 may generate the first decompression model from the acquired parameters and the form data stored in the first decompression model memory 221 (S114). Generating and reproducing the decoder G in the first decompression apparatus 22 as described above may result in a state where the lossy-compressed data compressed in the first compression apparatus 12 can be inputted into each layer.

Next, the first data decompressor 223 may input the lossy-compressed data into the first decompression model (decoder G) generated by the first decompression model generator 222 to decompress data (S116). The decompression of the lossy-compressed data may be executed, for example, by inputting data to be inputted into each layer of the decoder G as illustrated in FIG. 4.

Next, the first decompressed data outputter 224 may output the data decompressed by the first data decompressor 223 (S118).

As described above, the first decompression apparatus 22 may perform decompression of data subjected to lossy compression by the first compression apparatus 12.

As described above, the encoder F may be generated using the autoencoder, a predetermined output may be acquired from a predetermined layer of the encoder F and subjected to quantization, thereby enabling lossy compression of data. The lossy-compressed data can be decompressed by the decoder G into which the quantized data is inputted and which is generated at the same timing as the encoder F.

As described above, performing quantization in the intermediate layer (e.g., deepest layer) of the autoencoder can perform discretization of data. Further, executing the quantization, for example, by the continuous and differentiable pseudo quantization function enables backpropagation of the gradient to successfully perform the learning of the autoencoder.

Further, some of outputs of a plurality of layers (e.g., a predetermined number of layers selected from the deepest layer toward the shallowest layer) close to the intermediate layer (e.g., deepest layer), namely, a plurality of layers different in resolution may be quantized and acquired as compressed data in the encoder F, thereby making it possible to acquire the features of the original data autoencoded by the autoencoder, decrease the distortion in the decompressed data, and perform compression at high compression ratio.

When assuming that the ratio between the number of bits of the input data and the number of bits of the quantized data is r=(quantization bit number)/(input bit number), the data amount may be $(C_3/64+C_4/256+C_5/1024) \times r$. The values of $C_3$, $C_4$, $C_5$ and the quantization bit number may be set to be able to be changed to achieve a desired compression ratio.

In some embodiments, the quantized data may be further compressed by an encoding method such as a Huffman code, an arithmetic code, a range coder or the like. Since quantization enables efficient application of various data compression methods, it is also adoptable to compress the quantized data outputted from the encoder F, convert the data further compressed by the arithmetic code or the like before being decompressed in the decoder G to quantized data, and use the data as input to the decoder G.

In some embodiments, the compression method after the quantization is a lossless compression method. The second compression apparatus 14 being a lossless compression apparatus which further compresses the data compressed by the first compression apparatus 12, and the second decompression apparatus 24 which decompresses the data losslesscompressed by the second compression apparatus 14 will be described below. Performing the lossless compression can prevent the distortion occurring in the lossy compression from increasing in compressing the quantized data.

The example in which a model is generated at the timing when compressing data is described in the above example, but the model is not limited to this. In some embodiments, the first compression apparatus 12 and the first decompression apparatus 22 may perform the compression and decompression of data using a learned model. This configuration has the advantages that the time for the data compression can be reduced, and that optimization such as the increase of compression ratio and the suppression of distortion can be performed at higher level since a model can be comprehensively generated using not one image but, for example, other images stored as big data and a sufficient time for model generation can be secured.

In the case of the above configuration, the apparatus as illustrated in FIG. 2 may be configured as the learning apparatus. Then, after the compression model is generated by learning, the encoder layer of the compression model may be stored in the first compression model memory 121 and the decoder layer may be stored in the first decompression model memory 221.

In the case of using the learned model, the first compression apparatus 12 and the first decompression apparatus 22 can be constituted as apparatuses simpler than the apparatuses illustrated in FIG. 2 and FIG. 3. In some embodiments, the first compression model generator 122 and the first decompression model generator 222 are not necessary configurations.

The first data compressor 123 may execute compression of data by inputting data into the input layer of the first compression model learned in advance and stored in the first compression model memory 121 (namely, the encoder layer of the learned compression model). The compressed data may include data obtained by quantizing the data corresponding to the $C_3$, $C_4$, and $C_5$ channels (see FIG. 4).

Decompression of the compressed data may be performed using the first decompression model being the decoder of the learned model by the first decompression apparatus 22. The decompression of the data subjected to the first compression may be executed by inputting the compressed data, namely, the data obtained by quantizing the data corresponding to the $C_3$, $C_4$, and $C_5$ channels (see FIG. 4), from the lowermost layer of the decoder layer.

As in the above-described case, a plurality of models may be generated in advance by learning based on the priorities such as the compression ratio and distortion. The encoder layers of the plurality of models may be stored in the first compression model memory 121, and the decoder layers thereof may be stored in the first decompression model memory 221. In some embodiments, the first compression apparatus 12 may be configured to be able to designate which of the plurality of models is used for compression according to the request from the user. For example, information on which model has been used for compression may be stored in the header part of the compressed data, and the first decompression apparatus 22 may select which model is used for decompression from the information stored in the header part at the timing of decompression, and decompresses the data.

The selection of the compression model is not limited to selection from the plurality of prepared models, but may be realized by inputting a numerical value settable as a parameter. For example, the numerical values of $C_3$, $C_4$ and $C_5$ may be selected by the user to some extent, or the data corresponding to $C_2$ channels in the second layer may be acquired and added to the compressed data.

(Second Compression Apparatus, Second Decompression Apparatus)

Figure 11:
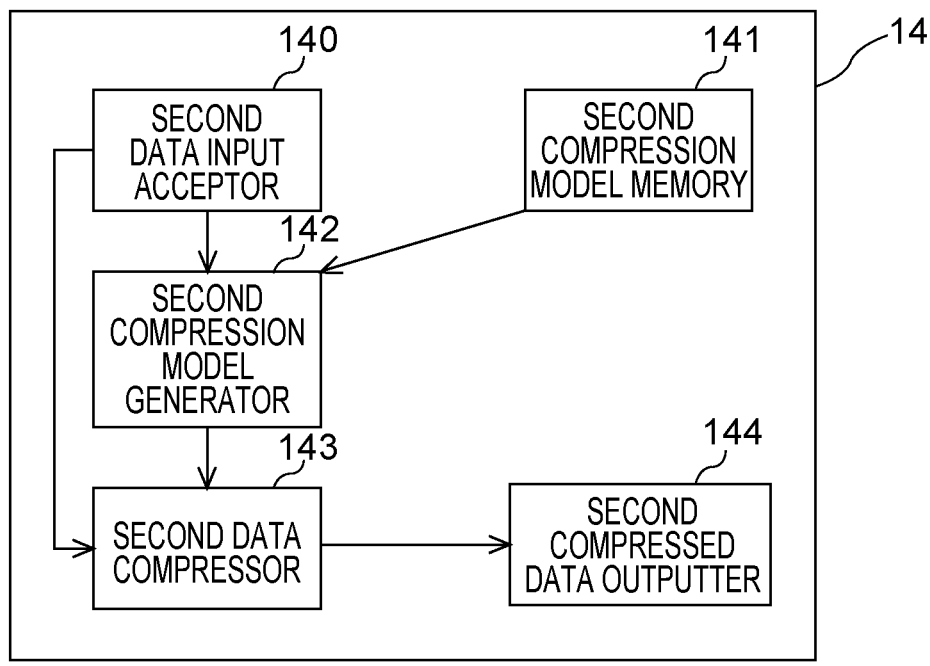
FIG. 11 illustrates the function of a second compression apparatus according to some embodiments.

FIG. 11 is a block diagram illustrating the function of the second compression apparatus 14. The second compression apparatus 14 may include a second data input acceptor 140, a second compression model memory 141, a second compression model generator 142, a second data compressor 143, and a second compressed data outputter 144. In the description of each function, detailed description of a portion overlapping with the function of the first compression apparatus 12 will be omitted.

Into the second data input acceptor 140, output data of each layer outputted by the first compression apparatus 12 may be inputted.

The second compression model memory 141 may store a form of a second compression model being a compression model in the second compression apparatus 14. In some embodiments, the second compression model memory 141 may be implemented with EPROM, EEPROM, SDRAM, and flash memory devices, CD ROM, DVD-ROM, or Blu-Ray® discs and the like.

The second compression model generator 142 may generate a model which estimates the probability distribution for performing the second compression being lossless compression.

The second data compressor 143 may perform lossless compression based on the probability distribution obtained by applying the generated second compression model to the input data. For the lossless compression, for example, a range coder is used. The second compression model enables use of the range coder by dividing the data according to a predetermined rule as described later, and calculating the probability distributions in the values of divided data.

The second compressed data outputter 144 may output data compressed by the second data compressor 143.

In some embodiments, at least one or more of the second data input acceptor 140, the second compression model generator 142, the second data compressor 143, and the second compressed data outputter 144 may be implemented with a special circuit (e.g., circuitry of a FPGA, CPU, GPU or other processing circuits implemented using electronic circuits), a subroutine in a program stored in memory (e.g., EPROM, EEPROM, SDRAM, and flash memory devices, CD ROM, DVD-ROM, or Blu-Ray® discs and the like) and executable by a processor (e.g., CPU, GPU and the like), or the like.

Figure 12:
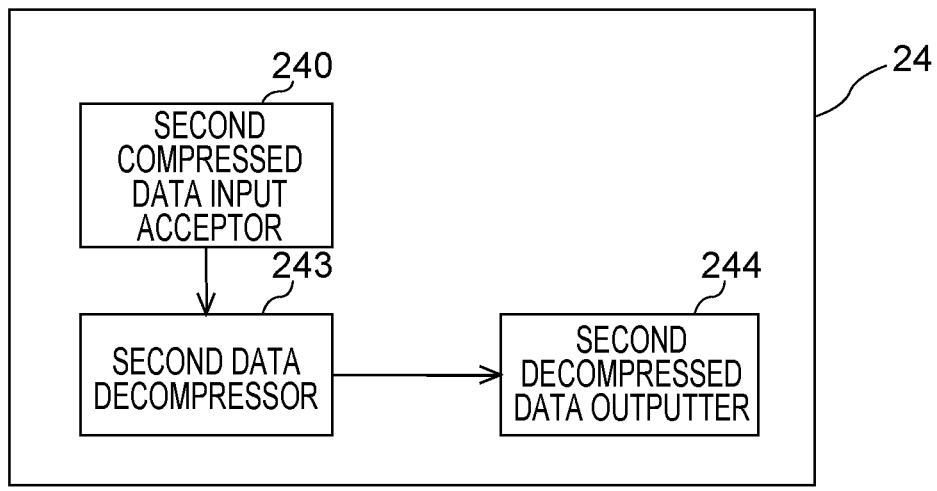
FIG. 12 illustrates the function of a second decompression apparatus according to some embodiments.

FIG. 12 is a block diagram illustrating the function of the second decompression apparatus 24. The second decompression apparatus 24 may include a second compressed data input acceptor 240, a second data decompressor 243, and a second decompressed data outputter 244.

Into the second compressed data input acceptor 240, the second compressed data outputted from the second compression apparatus 14 may be inputted. The second data decompressor 243 may decompress the inputted second compressed data on the basis of the data. The second decompressed data outputter 244 may outputs the decompressed data.

In some embodiments, at least one or more of the second compressed data input acceptor 240, the second data decompressor 243, and the second decompressed data outputter 244 may be implemented with a special circuit (e.g., circuitry of a FPGA, CPU, GPU or other processing circuits implemented using electronic circuits), a subroutine in a program stored in memory (e.g., EPROM, EEPROM, SDRAM, and flash memory devices, CD ROM, DVD-ROM, or Blu-Ray® discs and the like) and executable by a processor (e.g., CPU, GPU and the like), or the like.

(Second Compression Processing)

Figure 13:
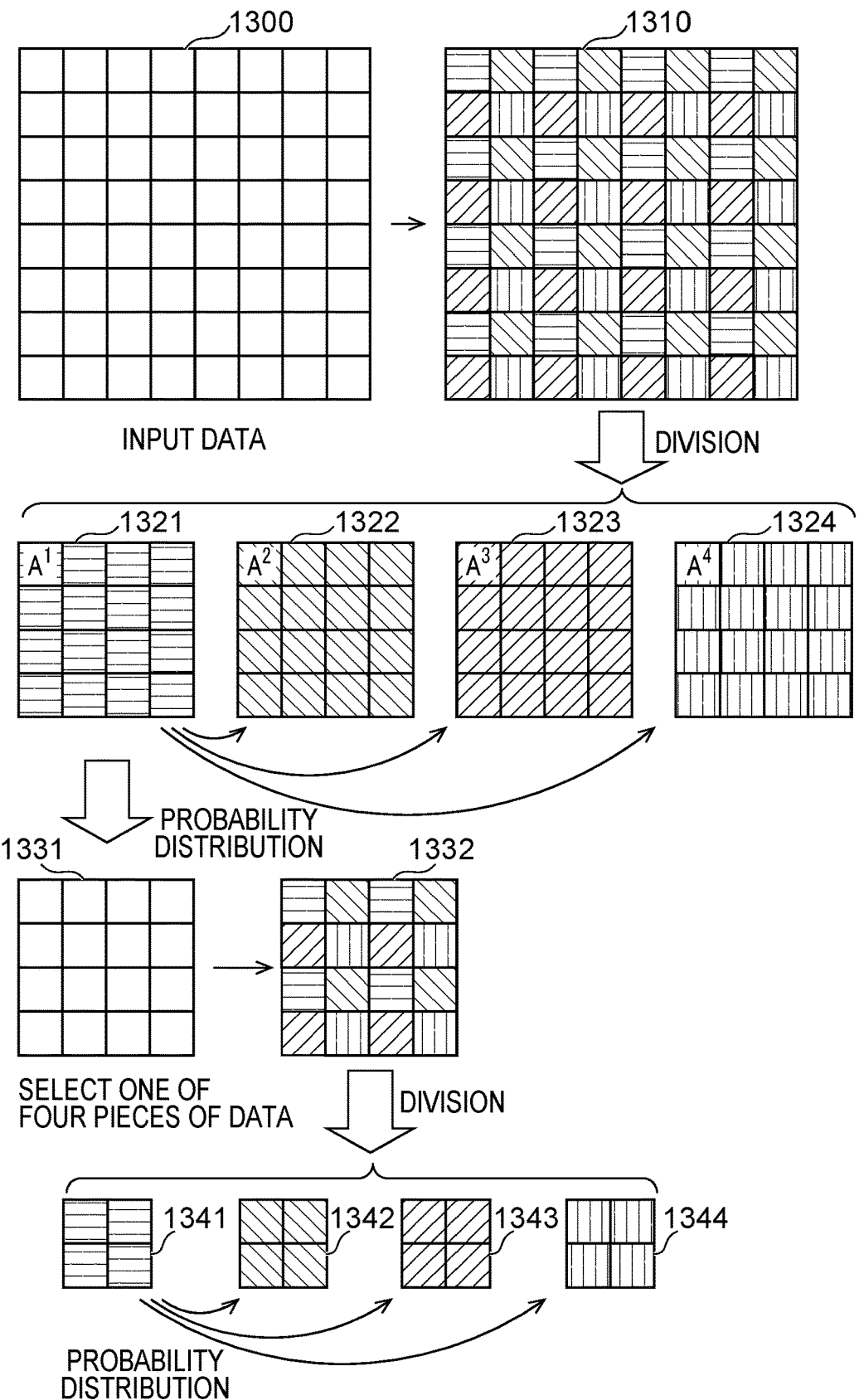
FIG. 13 illustrates the outline of second compression process according to some embodiments.

FIG. 13 is a chart illustrating the outline of the second compression processing.

When the occurrence probability of each of discretized values $\hat{z}$ is $p(\hat{z})$, encoding to allocate a code length $\log 2\, p(\hat{z})$ to $\hat{z}$ may be performed, resulting in optimal lossless compression. Such allocation of code may be performed by arithmetic coding.

To perform the arithmetic coding, the occurrence probability of $\hat{z}$ needs to be estimated. $\hat{z}$ is a multidimensional variable, so that when it is assumed that possible values in each dimension are N and the number of dimensions is m, the combination of them is Nm which is generally vast numerical values, leading to a difficulty in obtaining a histogram.

Hence, the occurrence probability of $\hat{z}$ is expressed as a product of conditional probabilities. In other words, it is assumed that $\hat{z}=(\hat{z}1, \ldots, \hat{z}m)$, $p(\hat{z})=p(\hat{z}1)\Pi p(\hat{z}i+1|\hat{z}1, \ldots, \hat{z}m)$. Each conditional distribution comes down to a problem of executing classification of predicting the value of $\hat{z}i$ taking N values.

Simply expressing the above equation as the conditional distribution, the occurrence probability cannot be found unless the output of the neural network is sequentially obtained m times. When m increases, the calculation time increases, leading to a difficulty in performing compression and decoding in a short time.

Hence, $\hat{z}$ is divided into several subsets, conditional independence between elements in the subset is supposed, and the above probability distribution is estimated. As an example, a case of estimating the probability distribution with data divided into four subsets will be described below. The above equation is rewritten as the following equation to estimate the probability distribution.

$$p(\hat{z}) = p(\hat{z}_1)\prod_{k=2}^{K}\prod_{i=1}^{l_k} p(\hat{z}_i^k | z_1, z_2, \cdots, z_{k-1}) \quad (6)$$

It is assumed here that K is the number of subsets (four in the following example) and $I_k$ is the number of elements in the subset. The conditional independence assumption as described above may suppress the sequential operation to K times and enable performance of parallel computations for $I_k$ operations.

Referring to FIG. 13, first, input data 1300 may be divided into four pieces of data 1321, 1322, 1323, 1324. For example, as illustrated in the drawing, the input data 1300 may be sectioned into a plurality of sections of 2×2 data of horizontal stripes, right down oblique lines, right up oblique lines, and vertical strips in sectioned data 1310. These sections may be combined and divided into four pieces of data 1321, 1322, 1323, 1324. In some embodiments, for implementing into a calculator, it is unnecessary to actually divide into the four pieces of data and recombine them. In some embodiments, without performing the division, it may only refer to data (in their original positions) at proper timing. Hereinafter, the data of horizontal stripes 1321 is referred to as first data, the data of right down oblique lines 1322 is referred to as second data, the data of right up oblique lines 1323 is referred to as third data, and the data of vertical strips 1324 is referred to as fourth data.

Using one piece of data of them as basic data, a model for estimating the probability distributions of the values of the other three pieces of data from the value of a pixel of the basic data may be generated by the neural network, for example, the CNN. This estimation model may not be for estimating the data itself, but may be generated as a model for obtaining, from the value of a certain pixel of the basic data, the probability distributions in which the values of corresponding pixels of the other pieces of data exist.

For example, referring to FIG. 13, in the case where the first data 1321 is the basic data, a model may be generated which estimates the probability distributions which form second data 1322, third data 1323, and fourth data 1324 being the other three pieces of data from the basic data. Focusing attention on the pixel at the most upper left, a model for estimating the probability distributions which take values of $A^2$, $A^3$ and $A^4$ from the value of $A^1$ may be generated.

It is unnecessary to estimate the probability distributions of all of the values of $A^2$, $A^3$ and $A^4$ from $A^1$, but the probability distribution of the value of $A^4$ may be estimated from $A^1$ and subsequently, probability distributions of the values of $A^2$ and $A^3$ may be estimated using both values of $A^1$ and $A^4$. As described above, it is possible to arbitrarily select to estimate the probability distribution of which data based on which data as a reference.

As a concrete example, first, a model for estimating the distribution of the value of the fourth data 1324 from the first data 1321 may be generated. A model in which when the first data is inputted into the input layer of the CNN, the fourth data is outputted to the output layer (as estimated data) may be generated as follows. By supervised learning, a model may be generated which when the first data is inputted into the input layer, the output layer outputs data of 4 (N) channels indicating the probabilities that each pixel entry of the fourth data takes values 0, 1, 2, 3, . . . , N−1 respectively when quantized by 4 (N) values.

In the case where the input data includes a plurality of channels, a model may be generated which generates a layer of outputting the probability distribution having N subchannels for each of inputted channels and outputs the data of the number of inputted channels from the output layer. By generating the model, in the case where the first data is inputted, the probability of taking each quantized value in each pixel of the fourth data may be outputted.

Other than the output of the output layer and the layer directly before the output layer, a general CNN may be formed to perform optimization. Similarly, models for outputting the probability distributions taking respective quantized values may be generated using the second data and the third data as supervised data.

Note that obtaining probability distribution from the first data to the fourth data, and then the second data and the third data have been described in the above, but not limited to this. More specifically, a model by joint probability distribution for obtaining the probability distributions for the second data, the third data, and the fourth data from the first data at the same timing may be generated.

Furthermore, a model for obtaining the probability distributions of the first data and the fourth data and then obtaining the probability distributions of the second data and the third data using the first data and the fourth data may be generated. In this case, as in the above case, a model capable of estimating the second data and the third data when the first data and the fourth data are inputted into the input layer along with the generation of the model for the fourth data from the first data, may be generated by supervised learning. The order and combination of the data estimation can be freely changed.

When the values of the other pieces of divided data can be expressed as probabilities with respect to the value of each pixel of the first data, the values of the second data, the third data, and the fourth data can be expressed by the code such as the range coder according to each pixel value of the first data and to the probability distributions to the other pieces of divided data. In some embodiments, the probability distribution can be accurately obtained by using the CNN and therefore a high compression ratio can be realized in the encoding of compressing the data based on the probability such as the range coder.

Referring back to FIG. 13, the first data 1331 may be sectioned as sectioned first data 1332 and further divided into four pieces 1341, 1342, 1343, 1344, and the first data itself may be further compressed as needed. In this case, the compression of data may be performed by applying the processing similar to the above processing to the first data. This compression may be realized by collectively compressing the data compressed by the range coder for each pixel and enumerating and storing the data, or by storing the data compressed as an amount expressing a point in a multidimensional space like vector quantization.

In the above processing, the second compression model generator 142 may perform generation of the CNN, and the second data compressor 143 may output data subjected to the second compression based on the probability distributions obtained from the input data estimated by the model generated by the second compression model generator 142. The compressed data may be provided with the above-described pixel values of the first data and required parameters for forming the CNN. Further, the compressed data may be provided with parameters for forming the second compression model.

The estimation may be used for acquiring the probability distributions and actual data compression may be performed by the range coder, so that even if the estimation (if used) is uncertain estimation, the compression can become lossless compression. The accuracy of the estimation can exert influence not on the element being lossless or lossy but on the compression ratio.

The second decompression apparatus 24 may first reproduce the second compression model from the data compressed by the second compression apparatus 14 to decompress the data.

Figure 14:
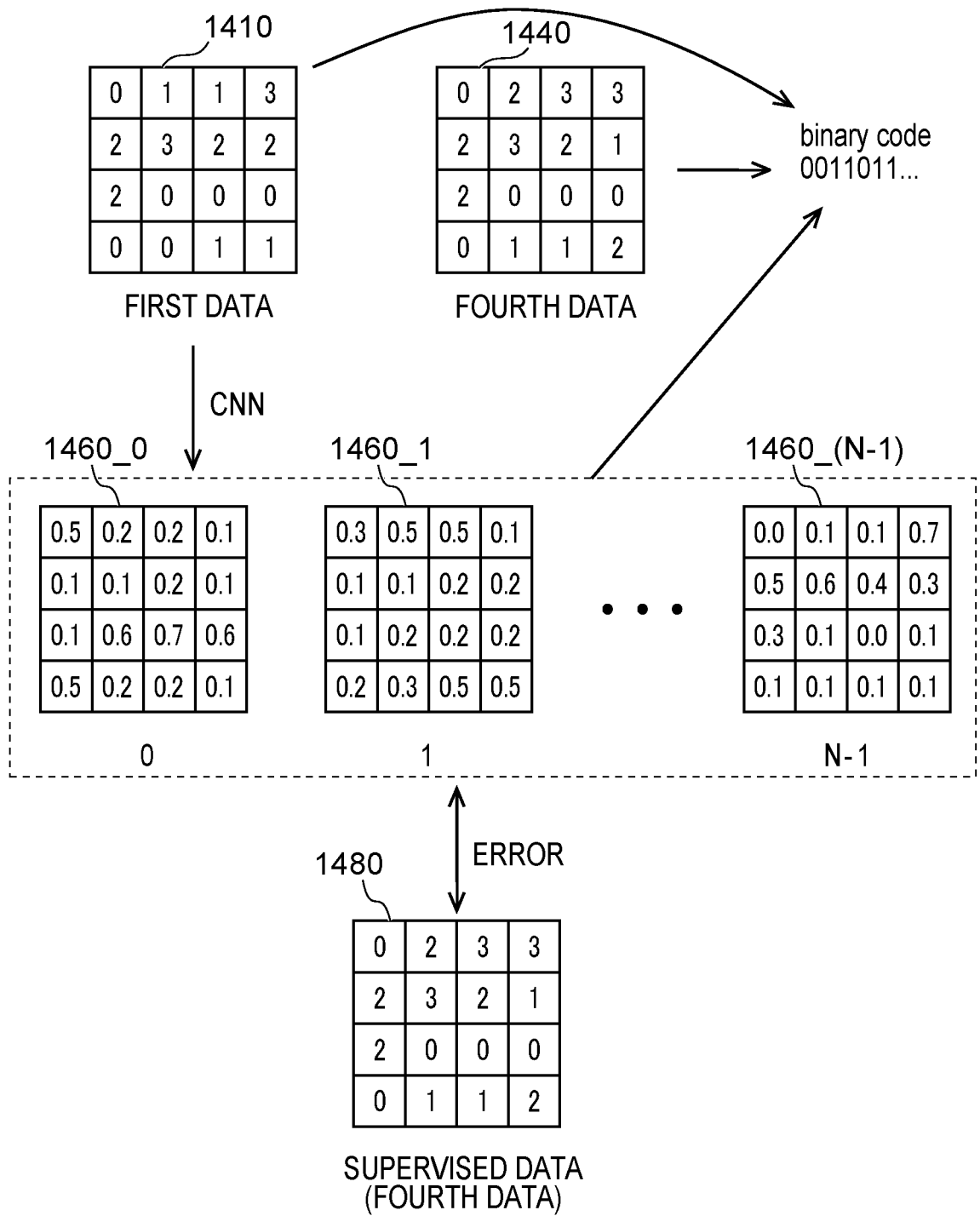
FIG. 14 illustrates an example of encoding in second compression according to some embodiments.

Hereinafter, the compression and decompression of data will be concretely described. FIG. 14 is a chart illustrating the outline of the compression processing in the second compression apparatus 14 according to some embodiments.

Referring to FIG. 14, first, the model for estimating fourth data 1440 from first data 1410 may be generated by the CNN. In the layer directly before the output layer, the probability distribution with respect to each quantized value as N 4×4 matrices 1460_0, 1460_1, . . . 1460_(N−1) may be outputted as surrounded by a broken line in the drawing. For example, the quantized value of the pixel at the upper left in the first data 1410 is 0, and the quantized value of the pixel at the upper left in the fourth data 1440 is 0.

In this case, the value of the pixel at the upper left of the probability distribution in the matrices 1460_0, 1460_1, . . . 1460_(N−1) (which are obtained by inputting the first data into the generated model) indicates the probability that the fourth data becomes 0, 1, . . . , N−1 when the first data of the pixel at the upper left is 0. In the illustrated example, each value of the pixel at the upper left of the matrices 1460_0, 1460_1, . . . 1460_(N−1) means that the upper left pixel of the fourth data becomes 0 at a probability of 0.5, becomes 1 at a probability of 0.3, . . . , and becomes N−1 at a probability of 0.0.

After the generation of the model by the CNN, the first data may be inputted into the generated model, and a binary code (denoted by reference number 1450 in FIG. 14) 0011011 . . . may be outputted by the range coder based on the first data, the fourth data, and the probability of taking each quantized value. The binary code may be provided in the compressed data.

Figure 15:
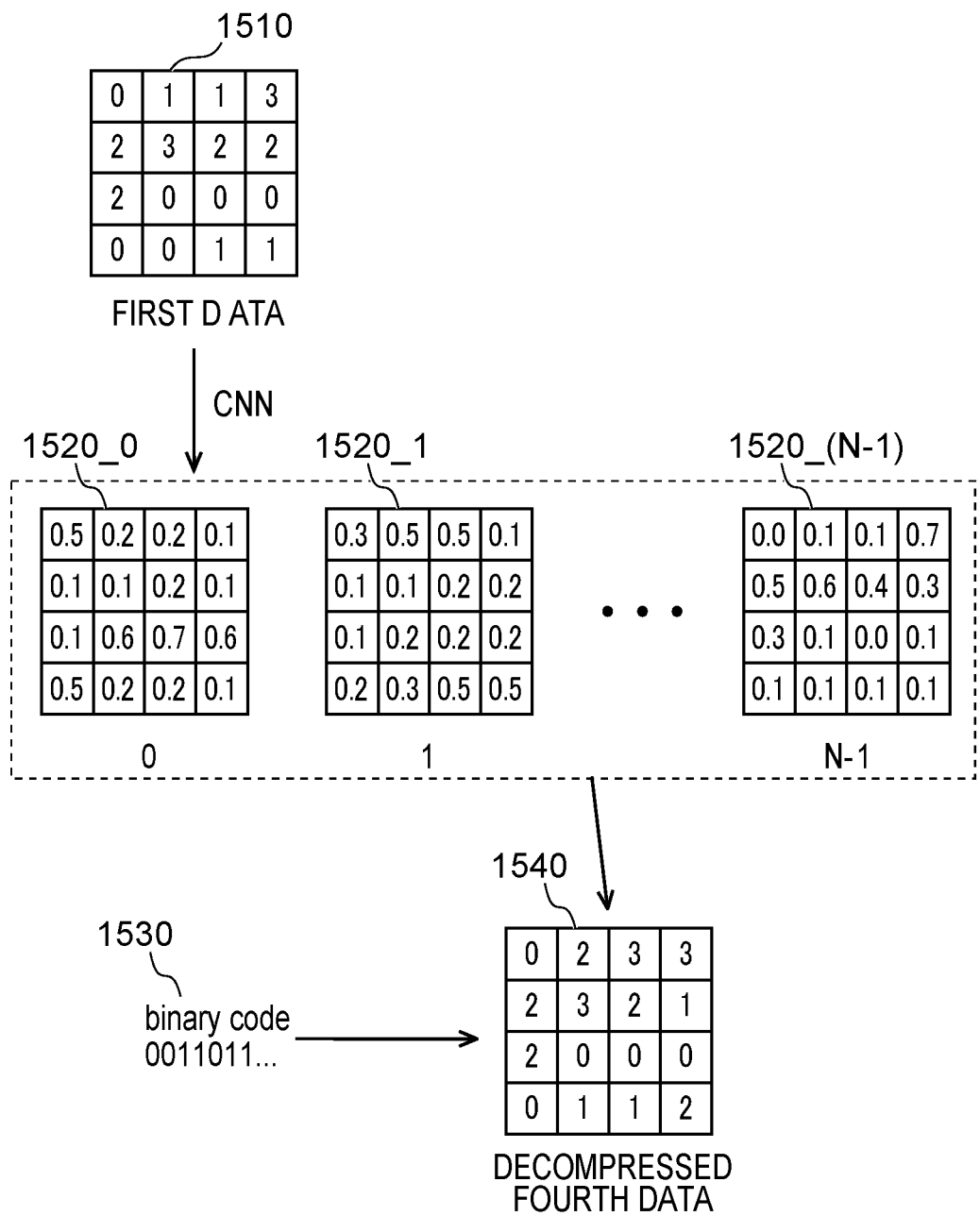
FIG. 15 illustrates an example of decoding in second decompression according to some embodiments.

FIG. 15 is a chart illustrating the outline of the decompression processing in the second decompression apparatus 24 according to some embodiments.

First, the second decompression apparatus 24 may reproduce the model for obtaining the probability distributions from the parameters for forming the model stored in the compressed data.

Subsequently, referring to FIG. 15, first data 1510 stored in the compressed data may be inputted into the reproduced model to acquire the probability distribution (represented as 4×4 matrices 1520_0, 1520_1, . . . , 1520_(N−1)) of data transition from the first data to the fourth data.

Next, the fourth data may be decompressed as decompressed fourth data 1540 based on the acquired probability distribution and on a binary code 1530 stored in the compressed data.

Use of the first data stored in the compressed data and the binary data based on the probability distributions of the first data and the fourth data enables precise decompression of the compressed fourth data.

In the case of a plurality of channels, the compression and decompression processing may be performed for each channel. In the case where the first data is further divided, the first data may be first decompressed from the subdata of the divided first data, and other pieces of data may be decompressed based on the decompressed data to thereby decompress the data of the channel, namely, the input data in FIG. 13.

This division can be performed any number of times. Regarding the generation of the compressed data, it is adoptable, for example, to determine the number of times of division beforehand, to determine beforehand to perform division until the number of pixels of the data becomes a predetermined number or less or to perform division until the compression efficiency by the division becomes a predetermined numeral value or less, or the like.

The case where the compression efficiency by the division becomes a predetermined numeral value or less may be, for example, the case where the size of the compressed data including the parameters and the like for model generation becomes larger than the size of the subdata before compression or the like.

Note that the whole processing flows of the data compression and data decompression are the same as those in the flowcharts illustrated in FIG. 9 and FIG. 10 in the main portions, and therefore detailed description will be omitted.

Figure 16:
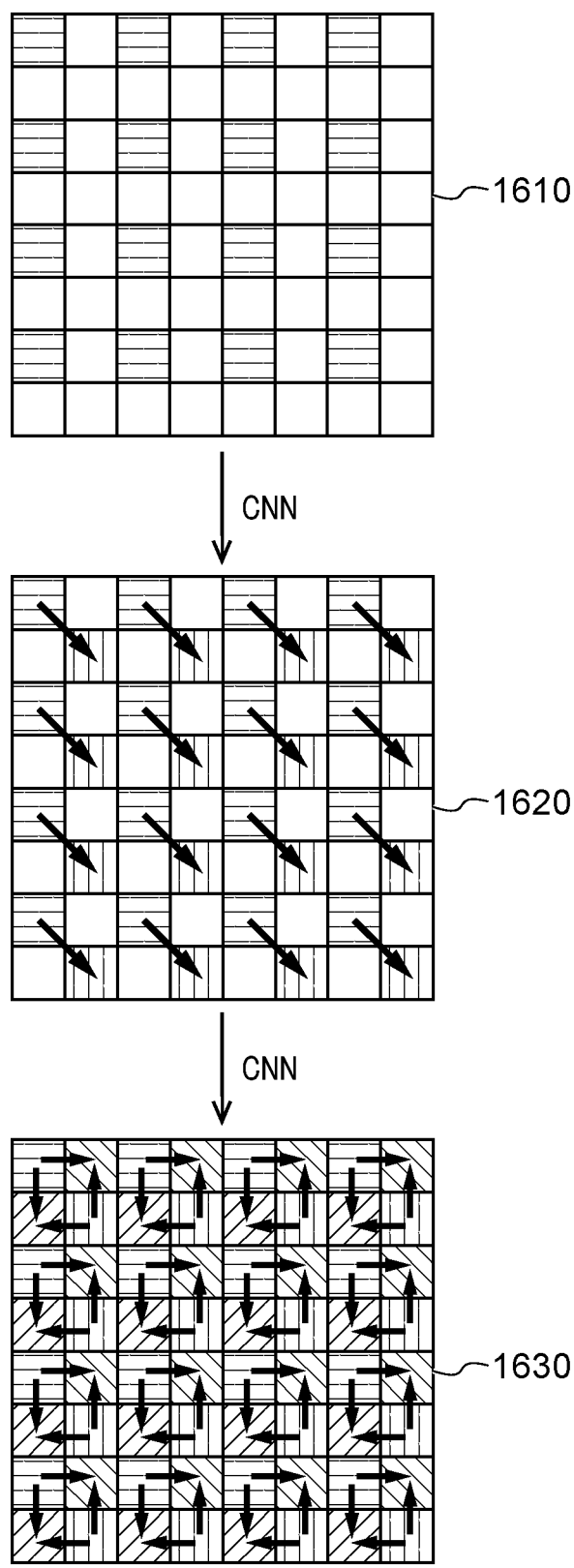
FIG. 16 illustrates an example of the second decompression according to some embodiments.

FIG. 16 is a chart illustrating an example of decompressing the value of each pixel from the probability distributions. As illustrated in the data representation 1610 at the top of FIG. 16 and the data representation 1620 at the middle of FIG. 16, the fourth data (indicated by vertical stripes) may be first decompressed from the first data (indicated by horizontal stripes). Next, as illustrated in the data representation 1630 at the bottom of FIG. 16, the second data (indicated by right down oblique) and the third data (indicated by right up oblique) may be decompressed from the first data and the fourth data. This decompression can be a closed operation in 2×2 pixels, and therefore can be performed in parallel.

Figure 17:
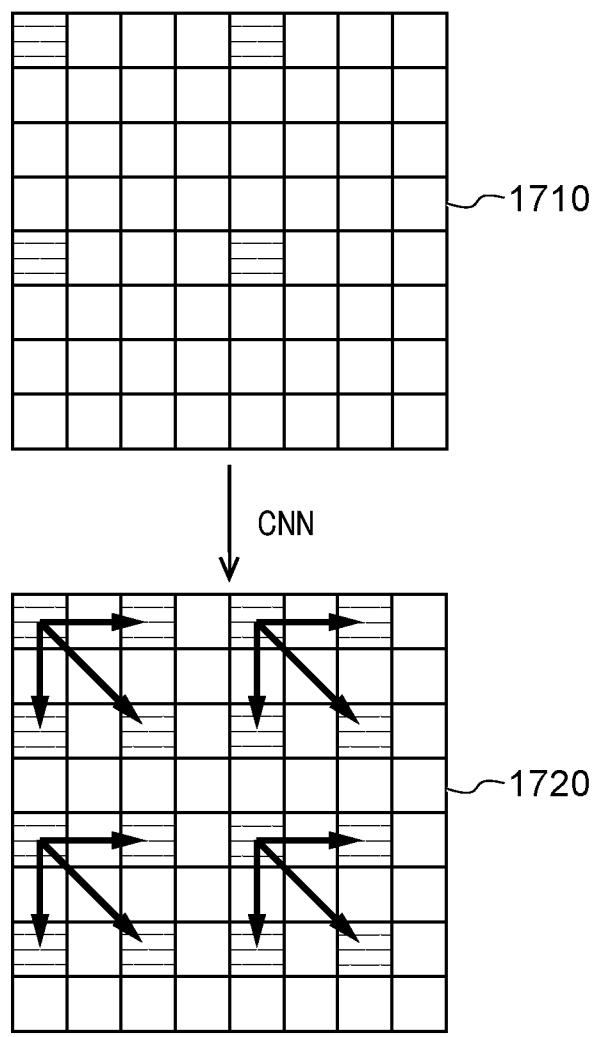
FIG. 17 illustrates an example of the second decompression according to some embodiments.

The decompression may be performed not using the subset as the pixels existing in 2×2 but using a sparser matrix. FIG. 17 is a chart illustrating an example of the decompression from a subset of 4×4 as a decompression example from a sparse matrix. First, as illustrated in the data representation 1710 at the top of FIG. 17, the data corresponding to the first data in FIG. 16 can be represented using the sparse matrix. As the subsequent processing, as illustrated in the data representation 1720 at the bottom of FIG. 17, the subsequent processing equivalent to the processing in FIG. 16 may be performed.

Figure 18:
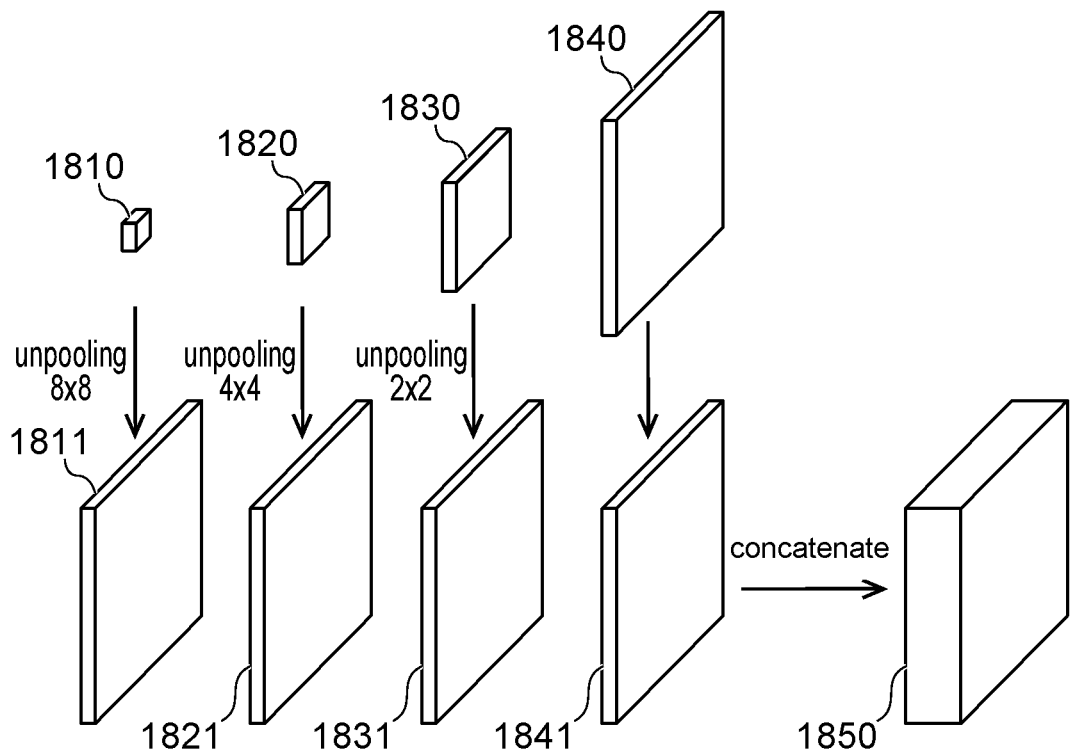
FIG. 18 is a view illustrating an example of the second decompression according to some embodiments.

The decompressed pieces of data in the layers, namely, the pieces of data different in resolution may be inputted into the layers of the CNN and thereby integrated. FIG. 18 is a view illustrating an example in a case of integrating pieces of data different in resolution into one piece of data.

As illustrated in FIG. 18, pieces of data different in resolution may be subjected to unpooling and inputted into the layers of the CNN. The unpooling may be executed so that images different in resolution can become the same size. In the case of performing data integration from pieces of data different in resolution, the data in a common channel may be estimated in some cases. In such a case, in some embodiments, the estimation of the data in the common channel may be performed only once, and other operation forming common data is not performed, thereby enabling suppression of the operation cost. For example, referring to FIG. 18, first input data 1810 in (8×8) resolution, second input data 1820 in (4×4) resolution, third input data 1830 in (2×2) resolution, and fourth input data 1840 in (1×1) resolution may be respectively subject to unpooling to generate first output data 1811, second output data 1821, third output data 1831, and fourth output data 1841, all of which have the same size. Subsequently, the first output data 1811, second output data 1821, third output data 1831, and fourth output data 1841 may be concatenated to form integrated data 1850.

As described above, the second compression may be performed on the data directly indicating the data of the pixel value of the first compressed data being the quantized data, namely, the data corresponding to the data corresponding to the $C_3$, $C_4$, and $C_5$ channels in FIG. 4 to thereby enable compression of data at high compression ratio.

Further, since the value of the next pixel is obtained not pixel by pixel both in encode and decode but encode and decode can be performed at the same timing as the whole tensor, time for encode and decode can be shortened.

Note that as described above, the second compression apparatus 14 and the second decompression apparatus 24 (see FIG. 1) do not always need to be used together with the first compression apparatus 12 and the first decompression apparatus 22 (see FIG. 1), but can independently perform compression of data. In this case, the second data input acceptor 140 (see FIG. 11) may accept input of data being a compression object. The second compression apparatus 14 can handle the quantized data, namely, the data discretized to a finite number of values, and therefore its application range is wide.

Similarly to the above-described first compression apparatus 12 and first decompression apparatus 22, the second compression apparatus 14 and the second decompression apparatus 24 may learn in advance and store the learned model and thereby can perform lossless compression and decompression at high speed. Further, the model to be used may be selected based on the shape of the inputted data, for example, from which layer to which layer of data is used, or the like.

(Data Processing System)

The whole processing as the data processing system 1 (see FIG. 1) in the above-described embodiment can be summarized as follows.

[Lossy Compression]

The inputted data may be used to generate a model to output the data inputted from the output layer by the autoencoder in the first compression apparatus 12. The autoencoder may be formed by the CNN. A predetermined number of layers (e.g., three layers in the above) closest to the intermediate layer in the encoder layer of the autoencoder may be optimized to output the data forming the main body of the compressed data in addition to the output of each layer of the general CNN. The data for outputting from the predetermined number of layers may be quantized and outputted as lossy-compressed data. In the optimization of the autoencoder, the decoder G may be optimized so that the quantized data is decoded to the inputted data

[Lossless Compression]

The second compression apparatus 14 may generate a model based on the CNN capable of estimating the probability distribution for the pixels in the surroundings, whereby the lossy-compressed data is lossless-compressed by the method such as the arithmetic coding using the probability distribution.

The lossless-compressed data may be subjected to appropriate processing when needed and outputted as final compressed data.

[Decompression of Lossless-Compressed Data]

The lossless-compressed data may be decompressed in the second decompression apparatus 24. The decompression may be decompression of data compressed by the arithmetic coding or the like. The decompressed data may become the same as the lossy-compressed data outputted from the first compression apparatus 12.

[Decompression of Lossy-Compressed Data]

The layer of the decoder G of the model generated by the first compression apparatus 12 may be reproduced in the first decompression apparatus 22 by acquiring the parameters thereof, and the lossy-compressed data may be inputted to the layer close to the intermediate layer of the decoder G and thereby being reproduced and outputted.

As described above, according to some embodiments, quantization with less distortion may be performed by the first compression to compress data, and further compression of quantized data may be performed by the second compression. Execution of the lossy compression with less distortion and the lossless compression at high compression ratio and in a short processing time can provide the data compression and decompression with less distortion, at high compression ratio, and in a short processing time.

[Storage Example of Compressed Data]

In the data subjected to the first compression and the second compression, parameters for generating the decompression model in each decompression apparatus may be stored. The data may be small as compared with the data representing the contents of data to be compressed, and therefore rarely contributes to the increase of compression ratio or the like. Hence, the storage method for data other than the parameters will be described.

Figure 19:
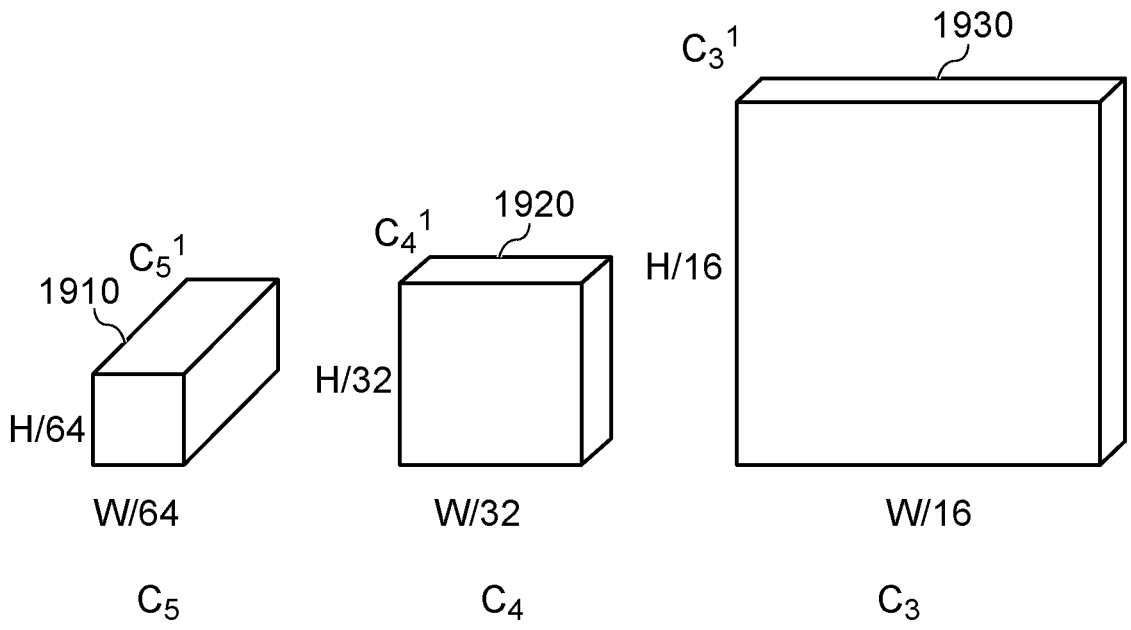
FIG. 19 illustrates an example of storage of compressed data according to some embodiments.

FIG. 19 is a view schematically illustrating the storage example of the compressed data according to some embodiments. Hereinafter, the example with the number of pixels illustrated in FIG. 4 will be described.

From the encoder F of the first compression model, the quantized data corresponding to the $C_3$ channels may be outputted from the third layer, the quantized data corresponding to the $C_4$ channels may be outputted from the fourth layer, and the quantized data corresponding to the $C_5$ channels may be outputted from the fifth layer.

First, data 1910 of (W/64)×(H/64)×$C_5$ corresponding to the first data ($C_5^1$) may be stored as the data corresponding to the $C_5$ channels. Subsequently, data 1920 of (W/32)×(H/32)×$C_4$ corresponding to the first data ($C_4^1$) may be stored as the data corresponding to the $C_4$ channels. Then, data 1930 of (W/16)×(H/16)×$C_3$ corresponding to the first data ($C_3^1$) may be stored as the data corresponding to the $C_3$ channels.

Note that in the second compression, for example, the data corresponding to the $C_5$ channels may be used when performing compression for the $C_4$ channels. More specifically, the compression may be performed by a model for estimating the probability distributions of the numerical values of the second data, the third data, and the fourth data with respect to $C_4^1$ using the data corresponding to the $C_5$ channels and the data $C_4^1$.

Similarly, when performing compression for the $C_3$ channels, the compression may be performed by a model for estimating the probability distributions of the numerical values of the second data, the third data, the fourth data with respect to $C_3^1$ using the data obtained by expanding the data corresponding to the $C_5$ channels by 2×2 pixels, for example, the data obtained by doubling the width and doubling the height using the value of one pixel as values of right, lower, lower right pixels and using the data corresponding to the $C_4$ channels. The integration of layers different in resolution may be performed by performing unpooling for each layer as illustrated in FIG. 18.

The compression of the data in the data processing system 1 according to some embodiments can exhibit higher effects to the data which is relatively high in dependence on the peripheral data as viewed in image, sound and so on as is found from the use of the CNN.

Application Example

The above-described first data processing system 2 or second data processing system 3 (see FIG. 1) may perform compression and decompression of data by expressing the approximate generation probability of a signal. The generation probability of the signal can also be used as a prior distribution in Bayes estimation. The accuracy of statistics estimation can be improved through use as the prior distribution.

For example, the problem such as super resolution of image, noise removal, face image interpolation or the like can come down to a problem of solving the following optimization problem.

$$\min_x \mathrm{Loss}(x, y) + \lambda R(x) \quad (7)$$

Here, x is an image desired to be obtained, and y is an image being a key for obtaining x. For example, y is a low-resolution image provided in the case of super resolution problems, and is an image including noise in the case of noise removal problems. The first term Loss(x, y) represents an observation distribution such as log p(x|y), namely, a (physical) observation process of what observation image y is obtained from x. The second term R(x) represents a prior probability of log p(x|y), namely, what x is likely to be generated. λ is a parameter for balancing the first term with the second term.

The individual problem such as super resolution or noise removal may be characterized by how the first term is described. Such a problem becomes an ill-posed problem that a solution is underspecified only with the observation process of the first term and the information on the obtained observation image. In other words, a plurality of candidates of the original image including no noise possibly providing the same observation as the image including noise and the deteriorated low-resolution image and the high-resolution image may be generated. To solve the ill-posedness so as to obtain a more highly accurate solution, the information of the second term can be used. The second term may be used to bring the image being the solution closer to a more likely image with a higher probability, thereby enabling more highly accurate estimation.

The compression apparatus optimized in some embodiments can be used as R(x). Through use of the decoder G, the solution x desired to be obtained can be expressed as x=G(z). Since the compression apparatus approximately obtains the probability of the quantized y, the probability p(z) of z which is not subjected to quantization can be obtained in the form of, for example, linearly interpolating the probability of z after quantization. By using this expression, the following equation can be obtained.

$$\min_x \mathrm{Loss}(G(z), y) - \lambda \log p(z) \quad (8)$$

More specifically, the image x can be obtained by optimizing eq. 8. As described above, each compression apparatus in some embodiments can be used for the prior probability of Bayes estimation.

As described above, according to some embodiments, the neural network may be used to utilize the feature amount of holding local information so as to decrease the distortion down to details, and to utilize the feature amount of holding global information so as to increase the compression efficiency. Further, the neural network with estimated conditional probability can be utilized to successfully approximate the occurrence probability of the quantized feature amount to thereby increase the compression efficiency in the arithmetic coding while decreasing the number of operations according to the encoding, thereby realizing the data compression and the data decoding at high speed.

The input data may be the image data in the above-described embodiment, but not limited to this. For example, the input data may be voxel data representing a three-dimensional space made by spatially increasing dimensions or may be moving image data made by temporally increasing dimensions. Further, as another example, the input data may be sound data. Furthermore, it is also possible to apply general binary data after being converted by predetermined pre-processing such as digitizing a binary value.

The data processing system 1 according to the above-described embodiments can be applicable to the various kinds of data. These kinds of data may be subjected to data processing individually using the first data processing system 2 or the second data processing system 3.

A controller (not illustrated) may collectively or individually perform all or a part of the control of each of the functions in each of the parts in each of the apparatuses in each of the embodiments as illustrated in FIG. 2, FIG. 3, FIG. 11, FIG. 12. This controller may be a control circuit implemented by an analog, digital, or FPGA (Field Programmable Gate Array) or the like.

In the above-described entire description, at least a part of the devices or apparatus may be configured by hardware, or may be configured by software and a CPU and the like perform the operation based on information processing of the software. When it is configured by the software, a program which achieves above mentioned functions and at least a partial function thereof may be stored in a storage medium such as a flexible disk or a CD-ROM, and executed by making a computer read it. The storage medium is not limited to a detachable one such as a magnetic disk or an optical disk, but it may be a fixed-type storage medium such as a hard disk device or a memory. That is, the information processing by the software may be concretely implemented by using a hardware resource. Furthermore, the processing by the software may be implemented by the circuitry of a FPGA or the like and executed by the hardware. The generation of a learning model or processing after an input in the learning model may be performed by using, for example, an accelerator such as a GPU. Processing by the hardware and/or the software may be implemented by one or a plurality of processing circuitries representing CPU, GPU, and so on and executed by this processing circuitry. That is, the devices or the apparatus according to some embodiments may include a memory that stores information of data, a program, and the like, one or more processing circuitry that execute a part or all of the above-described processing, and an interface for communicating with the exterior.

Further, the data inference model according to some embodiments can be used as a program module which is a part of artificial intelligence software. That is, the CPU of the computer operates so as to perform computation based on the model stored in the storage part and output the result.

A person skilled in the art may come up with addition, effects or various kinds of modifications of the present disclosure based on the above-described entire description, but examples of the present disclosure are not limited to the above-described individual embodiments. Various kinds of addition, changes and partial deletion can be made within a range that does not depart from the conceptual idea and the gist of the present disclosure derived from the contents stipulated in claims and equivalents thereof.

The invention claimed is:

1. A method for compressing data comprising:
acquiring, by processing circuitry, data to be compressed; and
generating, by the processing circuitry, first compressed data based on an output obtained by inputting the data into a first neural network model;
wherein a size of the first compressed data is smaller than a size of the data, and the first compressed data includes at least a feature regarding a first resolution and a feature regarding a second resolution, the second resolution is higher than the first resolution,
wherein, in a device for decompressing data, the feature regarding the first resolution is inputted into one layer of a second neural network model and the feature regarding the second resolution is inputted into another layer of the second neural network model, the another layer being different from the one layer,
wherein the first neural network model has at least one layer and another layer which is deeper than the one layer of the first neural network model, the feature regarding the first resolution is generated based on an output of the another layer of the first neural network model, and the feature regarding the second resolution is generated based on at least a first portion of an output of the one layer of the first neural network model, and
wherein at least a second portion of the output of the one layer of the first neural network model is inputted into the another layer of the first neural network model.

2. The method according to claim 1, wherein the data is image data, a height of the output of the another layer of the first neural network model is equal to a half of a height of the output of the one layer of the first neural network model, and a width of the output of the another layer of the first neural network model is equal to a half of a width of the output of the one layer of the first neural network model.

3. The method according to claim 1, wherein the output obtained by inputting the data into the first neural network model is batch-normalized data.

4. The method according to claim 1, wherein the processing circuitry generates the feature regarding the first resolution and the feature regarding the second resolution by quantizing the output obtained by inputting the data into the first neural network model.

5. The method according to claim 4, wherein the quantization is executed by using at least one of differentiable quantization function, differentiable pseudo-quantization function, or stochastic quantization.

6. The method according to claim 4, wherein the processing circuitry further applies at least one of a clipping processing or a scale conversion process to the output of the first neural network model before the quantization.

7. The method according to claim 1, wherein a resolution about a feature included in the first compressed data is selected by user.

8. The method according to claim 1, wherein the first compressed data includes parameters for the second neural network model for decompressing of the first compressed data.

9. The method according to claim 1, wherein the first neural network model is selected from a plurality of models based on a compression ratio.

10. The method according to claim 1, wherein the processing circuitry further generates second compressed data which is losslessly-compressed from the first compressed data by using a third neural network model.

11. The method according to claim 10, wherein the third neural network model is a model which estimates an occurrence probability of the first compressed data, and the processing circuitry generates the second compressed data by arithmetic code based on the estimated occurrence probability.

12. The method according to claim 1, wherein an output of the one layer of the second neural network model is inputted into the another layer of the second neural network model.

13. The method according to claim 1, wherein the first portion and the second portion are the same.

14. A method for decompressing data comprising:
acquiring, by processing circuitry, compressed data; and
generating, by the processing circuitry, decompressed data by inputting the compressed data into a neural network model which has at least one layer and another layer;
wherein a size of the decompressed data is larger than a size of the compressed data, and the compressed data, including at least a feature regarding a first resolution and a feature regarding a second resolution which is higher than the first resolution, is generated based on an output of another neural network model that has inputted data to be compressed,
wherein the feature regarding the first resolution is inputted into the one layer and the feature regarding the second resolution is inputted into the another layer,
wherein the another neural network model has at least one layer and another layer which is deeper than the one layer of the another neural network model, the feature regarding the first resolution is generated based on an output of the another layer of the another neural network model, and the feature regarding the second resolution is generated based on at least a first portion of an output of the one layer of the another neural network model, and
wherein at least a second portion of the output of the one layer of the another neural network model is inputted into the another layer of the another neural network model.

15. The method according to claim 14, wherein an output of the one layer of the neural network model is inputted into the another layer of the neural network model.

16. The method according to claim 14, wherein the neural network model forms a decoder and the another neural network model forms an encoder.

17. The method according to claim 14, wherein the processing circuitry receives parameters of the neural network model from another device.

18. The method according to claim 14, wherein the compressed data includes parameters of the neural network model, and the processing circuitry generates the decompressed data by using the parameters.

19. The method according to claim 14, wherein the first portion and the second portion are the same.

20. A method for learning a model comprising:
inputting, by processing circuitry, first data into a first neural network model to generate second data which is compressed data of the first data;
inputting, by the processing circuitry, the second data into a second neural network model to generate third data which is decompressed data of the second data, the second data including a plurality of features each regarding different resolutions; and
learning, by the processing circuitry, the first neural network model and the second neural network model based on difference between the first data and the third data,
wherein a size of the second data is smaller than a size of the first data, and the second data includes at least a feature regarding a first resolution and a feature regarding a second resolution, the second resolution is higher than the first resolution,
wherein the feature regarding the first resolution is inputted into one layer of the second neural network model and the feature regarding the second resolution is inputted into another layer of the second neural network model, the another layer being different from the one layer,
wherein the first neural network model has at least one layer and another layer which is deeper than the one layer of the first neural network model, the feature regarding the first resolution is generated based on an output of the another layer of the first neural network model, and the feature regarding the second resolution is generated based on at least a first portion of an output of the one layer of the first neural network model, and
wherein at least a second portion of the output of the one layer of the first neural network model is inputted into the another layer of the first neural network model.

21. The method according to claim 20, wherein the first portion and the second portion are the same.

22. A device for compressing data comprising:
at least one memory; and
at least one processor configured to:
acquire data to be compressed; and
generate compressed data based on an output obtained by inputting the data into a first neural network model;
wherein a size of the compressed data is smaller than a size of the data, and the compressed data includes at least a feature regarding a first resolution and a feature regarding a second resolution, the second resolution is higher than the first resolution,
wherein, in a device for decompressing data, the feature regarding the first resolution is inputted into one layer of a second neural network model and the feature regarding the second resolution is inputted into another layer of the second neural network model, the another layer being different from the one layer,
wherein the first neural network model has at least one layer and another layer which is deeper than the one layer of the first neural network model, the feature regarding the first resolution is generated based on an output of the another layer of the first neural network model, and the feature regarding the second resolution is generated based on at least a first portion of an output of the one layer of the first neural network model, and
wherein at least a second portion of the output of the one layer of the first neural network model is inputted into the another layer of the first neural network model.

23. The device according to claim 22, wherein an output of the one layer of the second neural network model is inputted into the another layer of the second neural network model.

24. The device according to claim 22, wherein the first portion and the second portion are the same.

25. A device for decompressing data comprising:
at least one memory; and
at least one processor configured to:
acquire compressed data; and
generate decompressed data by inputting the compressed data into a neural network model which has at least one layer and another layer;
wherein a size of the decompressed data is larger than a size of the compressed data, and the compressed data, including at least a feature regarding a first resolution and a feature regarding a second resolution which is higher than the first resolution, is generated based on an output of another neural network model that has inputted data to be compressed, wherein the feature regarding the first resolution is inputted into the one layer and the feature regarding the second resolution is inputted into the another layer, wherein the another neural network model has at least one layer and another layer which is deeper than the one layer of the another neural network model, the feature regarding the first resolution is generated based on an output of the another layer of the another neural network model, and the feature regarding the second resolution is generated based on at least a first portion of an output of the one layer of the another neural network model, and wherein at least a second portion of the output of the one layer of the another neural network model is inputted into the another layer of the another neural network model.

26. The device according to claim 25, wherein an output of the one layer of the neural network model is inputted into the another layer of the neural network model.

27. The device according to claim 25, wherein the first portion and the second portion are the same.

* * * * *